United States Patent
Wang et al.

(10) Patent No.: US 10,812,303 B2
(45) Date of Patent: Oct. 20, 2020

(54) SEQUENCE CONFIGURATION METHOD, SUBFRAME GENERATION METHOD, NETWORK SIDE DEVICE, AND USER EQUIPMENT

(71) Applicant: HUAWEI TECHNOLOGIES CO., LTD., Shenzhen (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 15/763,116

(22) PCT Filed: Sep. 25, 2015

(86) PCT No.: PCT/CN2015/090760
§ 371 (c)(1),
(2) Date: Mar. 25, 2018

(87) PCT Pub. No.: WO2017/049602
PCT Pub. Date: Mar. 30, 2017

(65) Prior Publication Data
US 2020/0252252 A1  Aug. 6, 2020

(51) Int. Cl.
| | |
|---|---|
| H04L 27/26 | (2006.01) |
| H04W 68/00 | (2009.01) |
| H04W 64/00 | (2009.01) |
| H04W 56/00 | (2009.01) |
| H04W 88/04 | (2009.01) |

(52) U.S. Cl.
CPC ..... *H04L 27/2607* (2013.01); *H04W 56/0015* (2013.01); *H04W 64/00* (2013.01); *H04W 68/00* (2013.01); *H04W 88/04* (2013.01)

(58) Field of Classification Search
CPC .............. H04L 27/2607; H04W 68/00; H04W 56/0015; H04W 64/00; H04W 88/04
See application file for complete search history.

(56) References Cited

U.S. PATENT DOCUMENTS

| | | |
|---|---|---|
| 2014/0064263 A1 | 3/2014 | Cheng et al. |
| 2014/0313997 A1 | 10/2014 | Xu et al. |
| 2015/0319724 A1 | 11/2015 | Chae et al. |
| 2016/0345307 A1 | 11/2016 | Huang et al. |

(Continued)

FOREIGN PATENT DOCUMENTS

| | | |
|---|---|---|
| CN | 103024924 A | 4/2013 |
| CN | 103826398 A | 5/2014 |
| CN | 104349303 A | 2/2015 |

(Continued)

*Primary Examiner* — Justin T Van Roie
(74) *Attorney, Agent, or Firm* — Kilpatrick Townsend & Stockton LLP

(57) ABSTRACT

Embodiments of the present invention provide a sequence configuration method, a subframe generation method, a network side device, and user equipment. The sequence configuration method includes: based on area division, generating, by a network side device, a first sequence group, and sending the first sequence group to a first device and a second device, so that the first device located in a first sub-area pages and/or synchronizes with the second device by using the first sequence group. In this way, the first device pages or synchronizes with the second device according to a sequence, thereby implementing paging for the second device.

19 Claims, 15 Drawing Sheets

(56) References Cited

U.S. PATENT DOCUMENTS

2016/0374038 A1    12/2016  Wang
2017/0070968 A1     3/2017  Kim et al.

FOREIGN PATENT DOCUMENTS

| | | |
|---|---|---|
| CN | 104796367 A | 7/2015 |
| CN | 104812025 A | 7/2015 |
| CN | 104812052 A | 7/2015 |
| CN | 104812069 A | 7/2015 |
| CN | 104823399 A | 8/2015 |
| CN | 104871614 A | 8/2015 |
| CN | 104871632 A | 8/2015 |
| WO | 2015122715 A1 | 8/2015 |

A first device receives a first sequence group sent by a network side device, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network device for the first sub-area after the network device divides the first area ~ 201

The first device pages or synchronizes with a second device by using the first sequence group, where the first device is user equipment located in the first sub-area and is a device that accesses the network side device, and the second device is a device that can access the network side device by using the first device ~ 202

FIG. 3

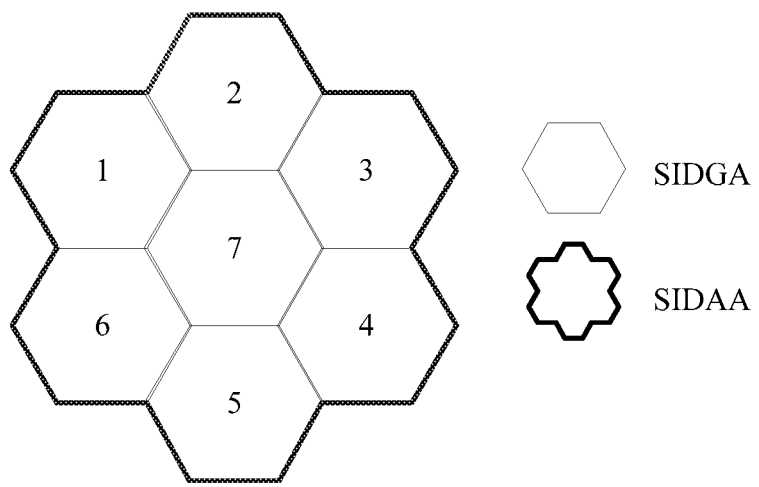

FIG. 4

SEQUENCE CONFIGURATION METHOD, SUBFRAME GENERATION METHOD, NETWORK SIDE DEVICE, AND USER EQUIPMENT

CROSS-REFERENCE TO RELATED APPLICATIONS

This application is a National Stage of International Application No. PCT/CN2015/090760, filed Sep. 25, 2015, which is hereby incorporated by reference in its entirety.

TECHNICAL FIELD

Embodiments of the present invention relate to communications technologies, and in particular, to a sequence configuration method, a subframe generation method, a network side device, and user equipment.

BACKGROUND

In a device-to-device (Device to Device, D2D) communication scenario, user equipment can access a network by using a network side device (such as a base station), and can further access the network side device by using other user equipment. In this process, user equipment providing a network access function for the other user equipment is a first device, for example, a device having a high capability such as a smartphone, and user equipment that accesses the network side device by using the first device is a second device, for example, a device having a low capability such as a wearable device. Each first device may be connected to a plurality of second devices. A communication process includes processes of paging the first device, synchronizing with the first device, paging the second device, and synchronizing with the second device.

In the process of paging the first device, the first device periodically wakes up, to receive a paging message sent by the network side device, and decode a paging control channel (Paging Control Channel, PCCH) and a paging channel (Paging Channel, PCH) according to the paging message, so as to determine whether the network side device pages the first device. In the process of synchronizing with the first device, the first device receives a primary synchronization signal PSS (Primary Synchronization Singal, PSS) and a secondary synchronization signal SSS (Secondary Synchronization Singal, PSS) that are sent by the network side device, and synchronizes with the network side device according to the PSS and the SSS.

Methods for paging and synchronizing with the first device by the network side device are described above. However, in addition to paging for the first device, paging and synchronization need to be performed on the second device. Therefore, how to page and synchronize with the second device is an urgent problem to be resolved in the industry.

SUMMARY

Embodiments of the present invention provide a sequence configuration method, a subframe generation method, a network side device, and user equipment, to implement paging for a second device.

According to a first aspect, an embodiment of the present invention provides a sequence configuration method, including:

generating, by a network side device, a first sequence group, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network side device for the first sub-area after the network side device divides the first area; and sending, by the network side device, the first sequence group to a first device and a second device, so that the first device pages and/or synchronizes with the second device by using the first sequence group, where the first device is user equipment located in the first sub-area and is a device that accesses the network side device, and the second device is a device that can access the network side device by using the first device.

In a first possible implementation of the first aspect, after the sending, by the network side device, the first sequence group to a first device, the method further includes:

determining, by the network side device, that the first device moves to a second sub-area, and keeping, by the network side device, a sequence group of the first device being configured to the first sequence group unchanged; or determining, by the network side device, that the first device moves to a second sub-area, and sending, by the network side device, a second sequence group to the first device, where the second sequence group is generated according to a sequence group corresponding to the second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

With reference to the first possible implementation of the first aspect, in a second possible implementation of the first aspect, before the determining, by the network side device, that the first device moves to a second sub-area, the method further includes:

receiving, by the network side device, a first notification message sent by the first device, where the first notification message indicates that the first device is located in the second sub-area, and the sequence group of the first device is the first sequence group.

In a third possible implementation of the first aspect, after the sending, by the network side device, the first sequence group to a first device, the method further includes:

determining, by the network side device, that the first device moves to a third sub-area, and sending, by the network side device, a third sequence group to the first device, where the third sequence group is generated according to a sequence group corresponding to the third sub-area, the third sub-area is one of all sub-areas in a second area, the third sequence group includes N mutually orthogonal sequences, and the second area is one of areas other than the first area in the Y areas.

With reference to the third possible implementation of the first aspect, in a fourth possible implementation of the first aspect, before the determining, by the network side device, that the first device moves to a third sub-area, the method further includes:

receiving, by the network side device, a second notification message sent by the first device, where the second notification message indicates that the first device is located in the third sub-area, and a sequence group of the first device is the first sequence group.

With reference to the third or the fourth possible implementation of the first aspect, in a fifth possible implementation of the first aspect, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

With reference to any one of the first aspect, or the first to the fifth possible implementations of the first aspect, in a sixth possible implementation of the first aspect, before the generating, by a network side device, a first sequence group, the method further includes:

dividing, by the network side device, the at least one cell to obtain the Y areas, and dividing the first area to obtain the X sub-areas.

With reference to any one of the first aspect, or the first to the fifth possible implementations of the first aspect, in a seventh possible implementation of the first aspect, sequences included in sequence groups corresponding to all the sub-areas included in the first area are mutually orthogonal.

With reference to any one of the first aspect, or the first to the seventh possible implementations of the first aspect, in an eighth possible implementation of the first aspect, the sending, by the network side device, the first sequence group to a first device and a second device includes:

sending, by the network side device to the first device and the second device, identifiers of the N mutually orthogonal sequences included in the first sequence group, so that the first device generates, according to the identifiers of the N mutually orthogonal sequences, a subframe carrying at least one first sequence, where the first sequence is one of the sequences included in the first sequence group.

With reference to the eighth possible implementation of the first aspect, in a ninth possible implementation of the first aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

With reference to the eighth possible implementation of the first aspect, in a tenth possible implementation of the first aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the extended cyclic prefix subframe.

According to a second aspect, an embodiment of the present invention provides a sequence configuration method, including:

receiving, by a first device, a first sequence group sent by a network side device, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network device for the first sub-area after the network device divides the first area; and paging or synchronizing with, by the first device, a second device by using the first sequence group, where the first device is user equipment located in the first sub-area and is a device that accesses the network side device, and the second device is a device that can access the network side device by using the first device.

In a first possible implementation of the second aspect, after the paging or synchronizing with, by the first device, a second device by using the first sequence group, the method further includes:

receiving, by the first device, a second sequence group sent by the network side device, where the second sequence group is generated according to a sequence group corresponding to a second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

With reference to the first possible implementation of the second aspect, in a second possible implementation of the second aspect, before the receiving, by the first device, a second sequence group sent by the network side device, the method further includes:

sending, by the first device, a first notification message to the network side device, where the first notification message indicates that the first device is located in the second sub-area, and a sequence group of the first device is the first sequence group.

In a third possible implementation of the second aspect, after the paging or synchronizing with, by the first device, a second device by using the first sequence group, the method further includes:

receiving, by the first device, a third sequence group sent by the network side device, where the third sequence group is generated according to a sequence group corresponding to a third sub-area, the third sub-area is one of all sub-areas in a second area, the third sequence group includes N mutually orthogonal sequences, and the second area is one of areas other than the first area in the Y areas.

With reference to the third possible implementation of the second aspect, in a fourth possible implementation of the second aspect, before the receiving, by the first device, a third sequence group sent by the network side device, the method further includes:

sending, by the first device, a second notification message to the network side device, where the second notification message indicates that the first device is located in the third sub-area, and a sequence group of the first device is the first sequence group.

With reference to the third or the fourth possible implementation of the second aspect, in a fifth possible implementation of the second aspect, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

With reference to any one of the second aspect, or the first to the fifth possible implementations of the second aspect, in a sixth possible implementation of the second aspect, sequences included in sequence groups corresponding to all the sub-areas included in the first area are mutually orthogonal.

With reference to any one of the second aspect, or the first to the fifth possible implementations of the second aspect, in a seventh possible implementation of the second aspect, the receiving, by a first device, a first sequence group sent by a network side device includes:

receiving, by the first device, identifiers that are sent by the network side device and that are of the N mutually orthogonal sequences; and generating, by the first device according to the identifiers of the N mutually orthogonal sequences, a subframe carrying at least one first sequence, where the first sequence is one of the sequences included in the first sequence group; and the paging or synchronizing with, by the first device, a second device by using the first sequence group includes:

sending, by the first device to the second device, the subframe carrying the at least one first sequence, so as to page or synchronize with the second device by using the at least one first sequence.

According to a third aspect, an embodiment of the present invention provides a subframe generation method, including:

generating, by a network side device, a first sequence group, where the first sequence group includes N mutually orthogonal sequences, and N≥1; and sending, by the network side device, identifiers of the N mutually orthogonal sequences to the first device and a second device, so that the first device generates, according to the identifiers of the N mutually orthogonal sequences, a subframe carrying at least one first sequence, and then the first device sends the subframe to the second device, and pages and/or synchronizes with the second device according to the at least one first sequence, where the first sequence is one of the sequences included in the first sequence group, the first device is a device that accesses the network side device, and the second device is a device that can access the network side device by using the first device.

In a first possible implementation of the third aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In a second possible implementation of the third aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

With reference to the third aspect, or the first or the second possible implementation of the third aspect, in a third possible implementation of the third aspect, the sequence is a synchronization sequence, and the synchronization sequence includes a primary synchronization sequence and a secondary synchronization sequence.

According to a fourth aspect, an embodiment of the present invention provides a subframe generation method, including:

receiving, by a first device, identifiers that are sent by a network side device and that are of N mutually orthogonal sequences, where the N mutually orthogonal sequences constitute a first sequence group, and N≥1;

generating, by the first device according to the identifiers of the N mutually orthogonal sequences, a subframe carrying at least one first sequence, where the first sequence is one of the sequences included in the first sequence group; and sending, by the first device to the second device, the subframe carrying the at least one first sequence, and paging and/or synchronizing with the second device according to the at least one first sequence, where the first device is a device that accesses the network side device, and the second device is a device that can access the network side device by using the first device.

In a first possible implementation of the fourth aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In a second possible implementation of the fourth aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

With reference to the fourth aspect, or the first or the second possible implementation of the fourth aspect, in a third possible implementation of the fourth aspect, the sequence is a synchronization sequence, and the synchronization sequence includes a primary synchronization sequence and a secondary synchronization sequence.

According to a fifth aspect, an embodiment of the present invention provides a network side device, including:

a processor, configured to generate a first sequence group, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network side device for the first sub-area after the network side device divides the first area; and a transmitter, configured to send, to a first device and a second device, the first sequence group generated by the processor, so that the first device pages and/or synchronizes with the second device by using the first sequence group, where the first device is user equipment located in the first sub-area and is a device that accesses the network side device, and the second device is a device that can access the network side device by using the first device.

In a first possible implementation of the fifth aspect, the processor is further configured to: after the transmitter sends the first sequence group to the first device, determine that the first device moves to a second sub-area, and keep a sequence group of the first device being configured to the first sequence group unchanged; or determine that the first device moves to a second sub-area, and send a second sequence group to the first device, where the second sequence group is generated according to a sequence group corresponding to the second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

With reference to the first possible implementation of the fifth aspect, in a second possible implementation of the fifth aspect, the device further includes: a receiver, configured to: before the processor determines that the first device moves to the second sub-area, receive a first notification message sent by the first device, where the first notification message indicates that the first device is located in the second sub-area, and the sequence group of the first device is the first sequence group.

In a third possible implementation of the fifth aspect, after the transmitter sends the first sequence group to the first device, the processor is further configured to:

determine that the first device moves to a third sub-area, and send a third sequence group to the first device, where the third sequence group is generated according to a sequence group corresponding to the third sub-area, the third sub-area is one of all sub-areas in a second area, the third sequence group includes N mutually orthogonal sequences, and the second area is one of areas other than the first area in the Y areas.

With reference to the third possible implementation of the fifth aspect, in a fourth possible implementation of the fifth aspect, the device further includes:

a receiver, configured to: before the processor determines that the first device moves to the third sub-area, receive a second notification message sent by the first device, where the second notification message indicates that the first device is located in the third sub-area, and a sequence group of the first device is the first sequence group.

With reference to the third or the fourth possible implementation of the fifth aspect, in a fifth possible implementation of the fifth aspect, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

With reference to any one of the fifth aspect, or the first to the fifth possible implementations of the fifth aspect, in a sixth possible implementation of the fifth aspect, before generating the first sequence group, the processor further divides the at least one cell to obtain the Y areas, and divides the first area to obtain the X sub-areas.

With reference to any one of the fifth aspect, or the first to the fifth possible implementations of the fifth aspect, in a seventh possible implementation of the fifth aspect, sequences included in sequence groups corresponding to all the sub-areas included in the first area are mutually orthogonal.

With reference to any one of the fifth aspect, or the first to the seventh possible implementations of the fifth aspect, in an eighth possible implementation of the fifth aspect, the transmitter is specifically configured to send, to the first device and the second device, identifiers of the N mutually orthogonal sequences included in the first sequence group, so that the first device generates, according to the identifiers of the N mutually orthogonal sequences, a subframe carrying at least one first sequence, where the first sequence is one of the sequences included in the first sequence group.

With reference to the eighth possible implementation of the fifth aspect, in a ninth possible implementation of the fifth aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

With reference to the eighth possible implementation of the fifth aspect, in a tenth possible implementation of the fifth aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the extended cyclic prefix subframe.

According to a sixth aspect, an embodiment of the present invention provides user equipment, the user equipment is a first device, and the first device includes:

a receiver, configured to receive a first sequence group sent by a network side device, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network device for the first sub-area after the network device divides the first area; and a processor, configured to page or synchronize with a second device by using the first sequence group received by the receiver, where the first device is user equipment located in the first sub-area and is a device that accesses the network side device, and the second device is a device that can access the network side device by using the first device.

In a first possible implementation of the sixth aspect, the receiver is further configured to: after the processor pages or synchronizes with the second device by using the first sequence group, receive a second sequence group sent by the network side device, where the second sequence group is generated according to a sequence group corresponding to a second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

With reference to the first possible implementation of the sixth aspect, in a second possible implementation of the sixth aspect, the device further includes:

a transmitter, configured to: before the receiver receives the second sequence group sent by the network side device, send a first notification message to the network side device, where the first notification message indicates that the first device is located in the second sub-area, and a sequence group of the first device is the first sequence group.

In a third possible implementation of the sixth aspect, the receiver is further configured to: after the processor pages or synchronizes with the second device by using the first sequence group, receive a third sequence group sent by the network side device, where the third sequence group is generated according to a sequence group corresponding to a third sub-area, the third sub-area is one of all sub-areas in a second area, the third sequence group includes N mutually orthogonal sequences, and the second area is one of areas other than the first area in the Y areas.

With reference to the third possible implementation of the sixth aspect, in a fourth possible implementation of the sixth aspect, the device further includes:

a transmitter, configured to: before the receiver receives the third sequence group sent by the network side device, send a second notification message to the network side device, where the second notification message indicates that the first device is located in the third sub-area, and a sequence group of the first device is the first sequence group.

With reference to the third or the fourth possible implementation of the sixth aspect, in a fifth possible implementation of the sixth aspect, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

With reference to any one of the sixth aspect, or the first to the fifth possible implementations of the sixth aspect, in a sixth possible implementation of the sixth aspect, sequences included in sequence groups corresponding to all the sub-areas included in the first area are mutually orthogonal.

With reference to any one of the sixth aspect, or the first to the fifth possible implementations of the sixth aspect, in a seventh possible implementation of the sixth aspect, the receiver is specifically configured to receive identifiers that are sent by the network side device and that are of the N mutually orthogonal sequences; and the processor is specifically configured to: generate, according to the identifiers of the N mutually orthogonal sequences, a subframe carrying at least one first sequence, where the first sequence is one of the sequences included in the first sequence group; and send, to the second device, the subframe carrying the at least one first sequence, so as to page or synchronize with the second device by using the at least one first sequence.

According to a seventh aspect, an embodiment of the present invention provides a network side device, including:

a processor, configured to generate a first sequence group, where the first sequence group includes N mutually orthogonal sequences, and $N \geq 1$; and a transmitter, configured to send, to the first device and a second device, identifiers of the N mutually orthogonal sequences included in the first sequence group generated by the processor, so that the first device generates, according to the identifiers of the N mutually orthogonal sequences, a subframe carrying at least one first sequence, and then the first device sends the subframe to the second device, and pages and/or synchronizes with the second device according to the at least one first sequence, where the first sequence is one of the sequences included in the first sequence group, the first device is a device that accesses the network side device, and the second device is a device that can access the network side device by using the first device.

In a first possible implementation of the seventh aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In a second possible implementation of the seventh aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

With reference to the seventh aspect, or the first or the second possible implementation of the seventh aspect, in a third possible implementation of the seventh aspect, the sequence is a synchronization sequence, and the synchronization sequence includes a primary synchronization sequence and a secondary synchronization sequence.

According to an eighth aspect, an embodiment of the present invention provides user equipment, the user equipment is a first device, and the first device includes:

a receiver, configured to receive identifiers that are sent by a network side device and that are of N mutually orthogonal sequences, where the N mutually orthogonal sequences constitute a first sequence group, and $N \geq 1$;

a processor, configured to generate, according to the identifiers that are received by the receiver and that are of the N mutually orthogonal sequences, a subframe carrying at least one first sequence, where the first sequence is one of the sequences included in the first sequence group; and a transmitter, configured to: send, to the second device, the subframe that is generated by the processor and that carries the at least one first sequence, and page and/or synchronize with the second device according to the at least one first sequence, where the first device is a device that accesses the network side device, and the second device is a device that can access the network side device by using the first device.

In a first possible implementation of the eighth aspect, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In a second possible implementation of the eighth aspect, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

With reference to the eighth aspect, or the first or the second possible implementation of the eighth aspect, in a third possible implementation of the eighth aspect, the sequence is a synchronization sequence, and the synchronization sequence includes a primary synchronization sequence and a secondary synchronization sequence.

According to the sequence configuration method, the subframe generation method, the network side device, and the user equipment that are provided in the embodiments of the present invention, based on area division, the network side device generates the first sequence group, and sends the first sequence group to the first device and the second device, so that the first device located in the first sub-area pages and/or synchronizes with the second device by using the first sequence group. In this way, the first device pages or synchronizes with the second device according to a sequence, thereby implementing paging for the second device.

BRIEF DESCRIPTION OF DRAWINGS

FIG. 3 is a flowchart of Embodiment 2 of a sequence configuration method according to the present invention;

FIG. 4 is a schematic diagram of area division to which a sequence configuration method is applicable according to the present invention;

DESCRIPTION OF EMBODIMENTS

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figures 1, 2:
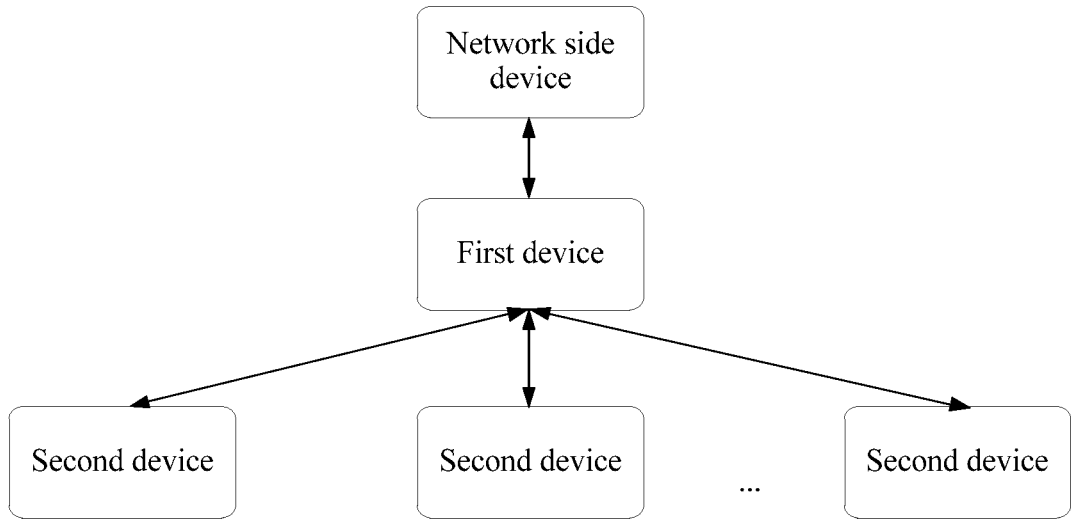
FIG. 1 is a schematic diagram of a network architecture to which a sequence configuration method is applicable according to the present invention.
FIG. 2 is a flowchart of Embodiment 1 of a sequence configuration method according to the present invention.

FIG. 1 is a schematic diagram of a network architecture to which a sequence configuration method is applicable according to the present invention. As shown in FIG. 1, in the network architecture, a first device is a device that accesses a network side device, the first device is connected to a plurality of second devices, and these second devices can access the network side device by using the first device. The first device is a device having a high capability such as a smartphone, and the first device may be used as a relay node to help a device having a low capability access the network side device. The second device is a device having a low capability such as a wearable device. The following describes a paging method and a synchronization method in the present invention in detail with reference to FIG. 1.

FIG. 2 is a flowchart of Embodiment 1 of a sequence configuration method according to the present invention. This embodiment is performed by a network side device, and is applicable to a scenario in which a first device needs to page and/or synchronize with a second device. Specifically, this embodiment includes the following steps.

101. The network side device generates a first sequence group, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network side device for the first sub-area after the network side device divides the first area.

In this embodiment of the present invention, the network device divides the at least one cell into the X sub-areas, and classifies the X sub-areas into the Y areas. The at least one cell is a plurality of cells that are subordinate to the network side device. Sequence groups are generated for different sub-areas or areas. The area division has two meanings.

In a first case, in a plurality of cells including a network side coverage area, one or more cells are divided into a plurality of areas, these areas are divided again, and each area is divided into a plurality of different sub-areas. In this case, a cell included in each sub-area may be a complete cell, or may be a partial area of a cell. Certainly, several cells may be divided into sub-areas at the same time. The present invention is not limited thereto.

In a second case, in a plurality of cells including a network side coverage area, the plurality of cells are divided into a plurality of sub-areas in units of cell, each sub-area includes at least one complete cell, and then the plurality of sub-areas are classified into a plurality of different areas.

In the following embodiments, if there is no special description, the present invention is described in detail by using the second case as an example.

Based on the foregoing area division and sub-area division, in this step, a network side generates the first sequence group for the first device according to an area and a sub-area that correspond to a position of the first device. For example, if the first device is connected to N−1 second devices, and the first device is located in the first sub-area, the first sequence group including the N sequences needs to be generated for the first device. The N sequences are mutually orthogonal sequences, one of the sequences is used for synchronization of the first device and the second devices, and the remaining N−1 sequences are used by the first device to page the N−1 second devices connected to the first device. Specifically, if the sequence group corresponding to the first sub-area includes 30 mutually orthogonal sequences, and the first device is connected to nine second devices, the first sequence group assigned by the network side device to the first device includes 10 mutually orthogonal sequences. When three first devices are located in the first sub-area, and each first device is connected to nine second devices, the network side device separately assigns, to each first device, 10 mutually orthogonal sequences that are different from those assigned to another first device.

102. The network side device sends the first sequence group to the first device and the second device, so that the first device pages and/or synchronizes with the second device by using the first sequence group, where the first device is user equipment located in the first sub-area and is a device that accesses the network side device, and the second device is a device that can access the network side device by using the first device.

Generally, each second device has an exclusive paging sequence, so that the first device can page the second device according to a requirement. However, in a synchronization process, all second devices may share a same synchronization sequence. Therefore, for the first device connected to the N−1 second devices, the first device needs to learn of the N sequences in the first sequence group, that is, one synchronization sequence and N−1 paging sequences. For a second device, the second device only needs to learn of an exclusive paging sequence of the second device and a public synchronization sequence, or learn of all the N−1 paging sequences and the public synchronization sequence. Therefore, in this step, when the second device is connected to the first device for the first time, the network side device sends the first sequence group to the first device and the second device, so that the first device pages the second device by using a paging sequence included in the first sequence group, and synchronizes with the second device by using a synchronization sequence included in the first sequence group. In this process, the network side may send all the paging sequences to the second device, or may send only the exclusive paging sequence of the second device to the second device. When the network device sends all the paging sequences to the second device, the second device may synchronize with the first device by using these paging sequences. That the first device synchronizes with the second device means that the first device sends a synchronization signal, and the second device synchronizes with the first device according to the synchronization signal. For example, the synchronization signal is specifically a synchronization sequence, the first device sends a subframe carrying the synchronization sequence, and the second device synchronizes with the second device according to the synchronization sequence.

According to the sequence configuration method provided in this embodiment of the present invention, based on area division, the network side device generates the first sequence group, and sends the first sequence group to the first device and the second device, so that the first device located in the first sub-area pages and/or synchronizes with the second device by using the first sequence group. In this way, the first device pages or synchronizes with the second device according to a sequence, thereby implementing paging for the second device.

FIG. 3 is a flowchart of Embodiment 2 of a sequence configuration method according to the present invention. This embodiment is performed by a first device, and is applicable to a scenario in which the first device needs to page and/or synchronize with a second device. Specifically, this embodiment includes the following steps:

201. The first device receives a first sequence group sent by a network side device, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network device for the first sub-area after the network device divides the first area.

202. The first device pages or synchronizes with the second device by using the first sequence group, where the first device is user equipment located in the first sub-area and is a device that accesses the network side device, and the second device is a device that can access the network side device by using the first device.

Specifically, for related descriptions of the area division, the first sequence group, and the like in steps 201 and 202, refer to the embodiment in FIG. 2. Details are not described herein again.

According to the sequence configuration method provided in this embodiment of the present invention, based on area division, the first device located in the first sub-area receives the first sequence group generated and sent by the network side device, and pages and/or synchronizes with the second device by using the first sequence group. In this way, the first device pages or synchronizes with the second device according to a sequence, thereby implementing paging for the second device.

The following first describes area division and sub-area division in the present invention in detail.

Specifically, before generating a first sequence group, a network side device divides at least one subordinate cell into X sub-areas, and then classifies the X sub-areas into Y areas. Each area includes at least one sub-area. For example, a sub-area is a synchronization identifier group area (synchronization ID group area, SIDGA), and an area is a synchronization identifier assignment area (synchronization ID assignment Area, (SIDAA)). Specifically, as shown in FIG. 4, FIG. 4 is a schematic diagram of area division to which a sequence configuration method is applicable according to the present invention. Each small hexagonal area is an SIDGA, and a polygon image including sub-areas is an SIDAA.

As shown in FIG. 4, an area (that is, an SIDAA) includes seven sub-areas (that is, SIDGAs). It should be noted that, even if the present invention is described in detail in FIG. 4 by using an example in which an SIDAA includes seven SIDGAs, the present invention is not limited thereto.

With reference to FIG. 4, the following describes the present invention in detail by using an example about how to assign a sequence group to a first device according to an SIDGA and an SIDAA in the present invention.

Referring to FIG. 4, in an SIDAA, a network side device assigns a sequence group to each SIDGA, sequences included in the sequence group are mutually orthogonal, thereby ensuring good orthogonality. For all SIDGAs included in an SIDAA, sequence groups corresponding to all the SIDGAs are mutually orthogonal, but good orthogonality cannot be ensured. For example, when a first device is located in an SIDGA 2 during startup initialization, the network side device generates a first sequence group according to a sequence group corresponding to the SIDGA 2, and assigns the first sequence group to the first device. For another example, when a plurality of first devices are located in different SIDGAs in an SIDAA, because sequence groups corresponding to all the SIDGAs are orthogonal, sequence groups of all the first devices are orthogonal.

Generally, because a second device is a device having a low capability, to avoid a problem of large power consumption caused by frequent decoding of the second device, when the network side device needs to page the second device, the network side device first pages a first device connected to the second device, and then the first device pages the second device by sending a sequence. In addition, in a synchronization process, the second device performs synchronization according to a synchronization sequence sent by the first device. However, when there are a plurality of first devices in a communication scenario of the present invention, if two or more first devices are close, and sequences sent by all the first devices are the same, the second device cannot determine a specific first device from which a sequence comes, and therefore, paging or synchronization for the second device cannot be implemented. It may be learned from FIG. 4 that, for first devices that are close to each other and located in all SIDGAs in a same SIDAA, sequence groups corresponding to all the SIDGAs are mutually orthogonal. Therefore, a disadvantage that the second device cannot be paged or synchronized because first devices that are close to each other send a same sequence can be overcome.

For each SIDAA, sequences may be orthogonal or may be reused. When the sequences are orthogonal, if a quantity of first devices is extremely large, a quantity of required sequences is also extremely large, and more resources are occupied. When the sequences are reused, because sequence groups of some SIDAAs are the same, a quantity of required resources can be reduced to some extent.

Figure 5:
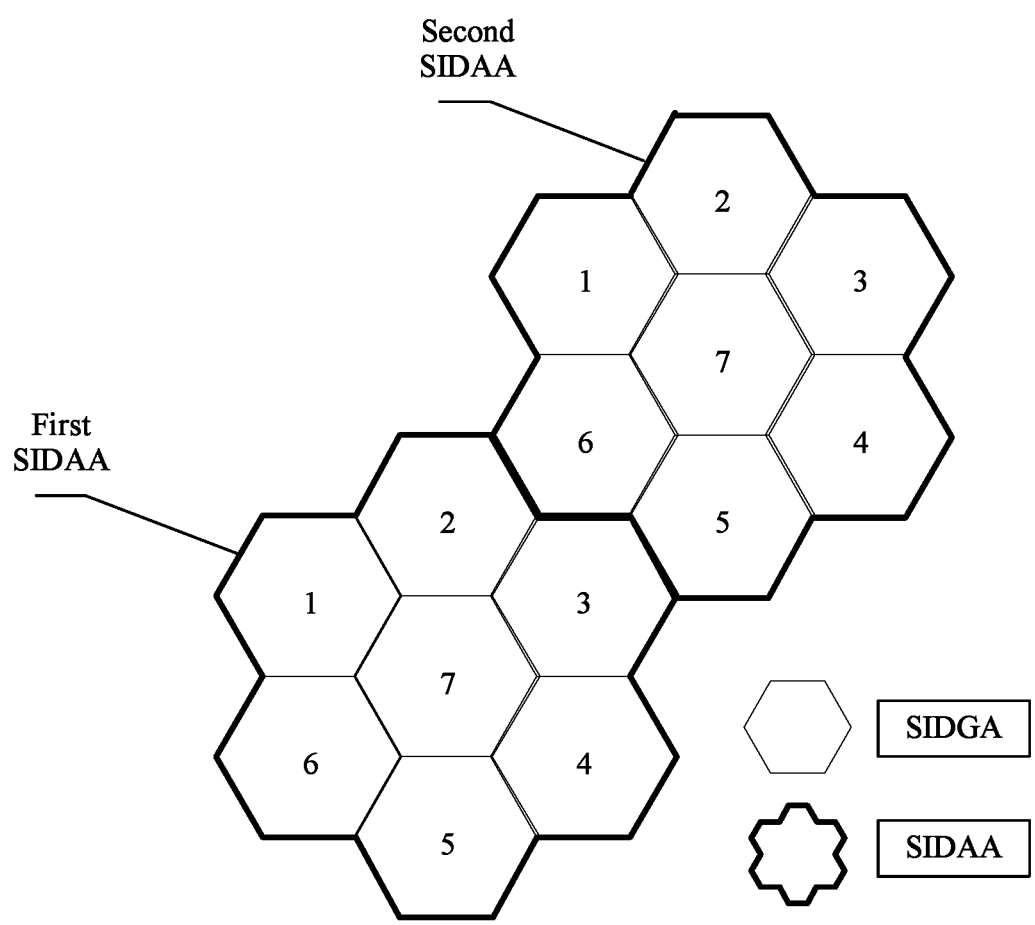
FIG. 5 is a schematic diagram of sequence reuse according to an embodiment of the present invention.

Specifically, if the first sub-area in the first area is adjacent to a third sub-area in the second area, a sequence included in a sequence group corresponding to the first sub-area and a sequence included in a sequence group corresponding to the third sub-area are mutually orthogonal; or if the first sub-area in the first area is not adjacent to the third sub-area in the second area, a sequence included in a sequence group corresponding to the first sub-area and a sequence included in a sequence group corresponding to the third sub-area are mutually orthogonal or to be reused. The following continues to describe sequence reuse in detail by using an example in which a sub-area is an SIDGA and an area is an SIDAA. Specifically, referring to FIG. 5, FIG. 5 is a schematic diagram of sequence reuse according to an embodiment of the present invention. Each small hexagonal area is an SIDGA, and a polygon image including sub-areas is an SIDAA.

Referring to FIG. 5, sequence resources of a first SIDAA and a second SIDAA may be reused, and a reuse rule may be: a same sequence resource is used in areas of SIDGAs with a same number. For example, sequence resources of an SIDGA 2 in the first SIDAA and an SIDGA 2 in the second SIDAA are the same. This can avoid a case in which different sequences are used in adjacent SIDGAs in two adjacent SIDAA areas, and ensure that users at the edge of the SIDAAs do not interfere with each other. For example, a first device located in the SIDGA 2 in the first SIDAA and a first device located in an SIDGA 6 in the second SIDAA do not interfere with each other. In addition, alternatively, the reuse rule may be: sequence resources of adjacent SIDGAs in two adjacent SIDAAs need to be different.

Still referring to FIG. 5, sequence groups corresponding to adjacent SIDGAs in adjacent SIDAAs are mutually orthogonal. Therefore, a disadvantage that a second device cannot be paged or synchronized because first devices that are close to each other send a same sequence can also be overcome.

In addition, if sequence groups assigned by a network side device to all first devices are different in an entire network, a quantity of required sequences is extremely large, and more resources are occupied. It may be learned from FIG. 5 that, a sequence resource may be reused between different SIDDAs, and therefore, a quantity of required sequence resources can be reduced to some extent.

Then, how to configure a sequence group by a network side device for a first device according to a position of the first device is described in detail. Specifically, the following first to fifth cases may be included.

In a first case, a first device moves between different SIDGAs in a same SIDAA.

Specifically, after step 102 in FIG. 2 is performed, that is, after the network side device sends the first sequence group to the first device, the network side device determines, after a period of time, that the first device moves to a second SIDGA. The second SIDGA is one of SIDGAs other than the first SIDGA in the first SIDAA. In this case, there are two different solutions.

In a first solution, the network side device keeps a sequence group of the first device being configured to the first sequence group unchanged. In this case, because sequence groups corresponding to all SIDGAs in a same SIDAA are mutually orthogonal, a sequence group may not be re-assigned to the first device.

In a second solution, the network side device sends a second sequence group to the first device, the second sequence group is generated according to a sequence group corresponding to a second sub-area, the second sequence group includes N mutually orthogonal sequences, and a sequence included in the sequence group corresponding to the sub-area and a sequence included in the sequence group corresponding to the second sub-area are mutually orthogonal. Because orthogonality of sequence groups corresponding to all SIDGAs in a same SIDAA is not necessarily good, when a first device moves from an SIDGA in an SIDAA to another SIDGA, if a sequence is not updated, orthogonality with a sequence group of another surrounding first device may be poor, resulting in confusion or a collision. However, sequences included in a sequence group corresponding to an SIDGA have good orthogonality. Therefore, a sequence group of the first device may be updated. Specifically, referring to FIG. 6A and FIG. 6B, FIG. 6A is a signaling diagram of sequence group assignment performed when a network side device determines that a first device moves between different SIDGAs in a same SIDAA in a sequence configuration method according to the present invention, and FIG. 6B is a signaling diagram of sequence group assignment performed when a first device determines that the first device moves between different SIDGAs in a same SIDAA in a sequence configuration method according to the present invention.

Figure 6A:
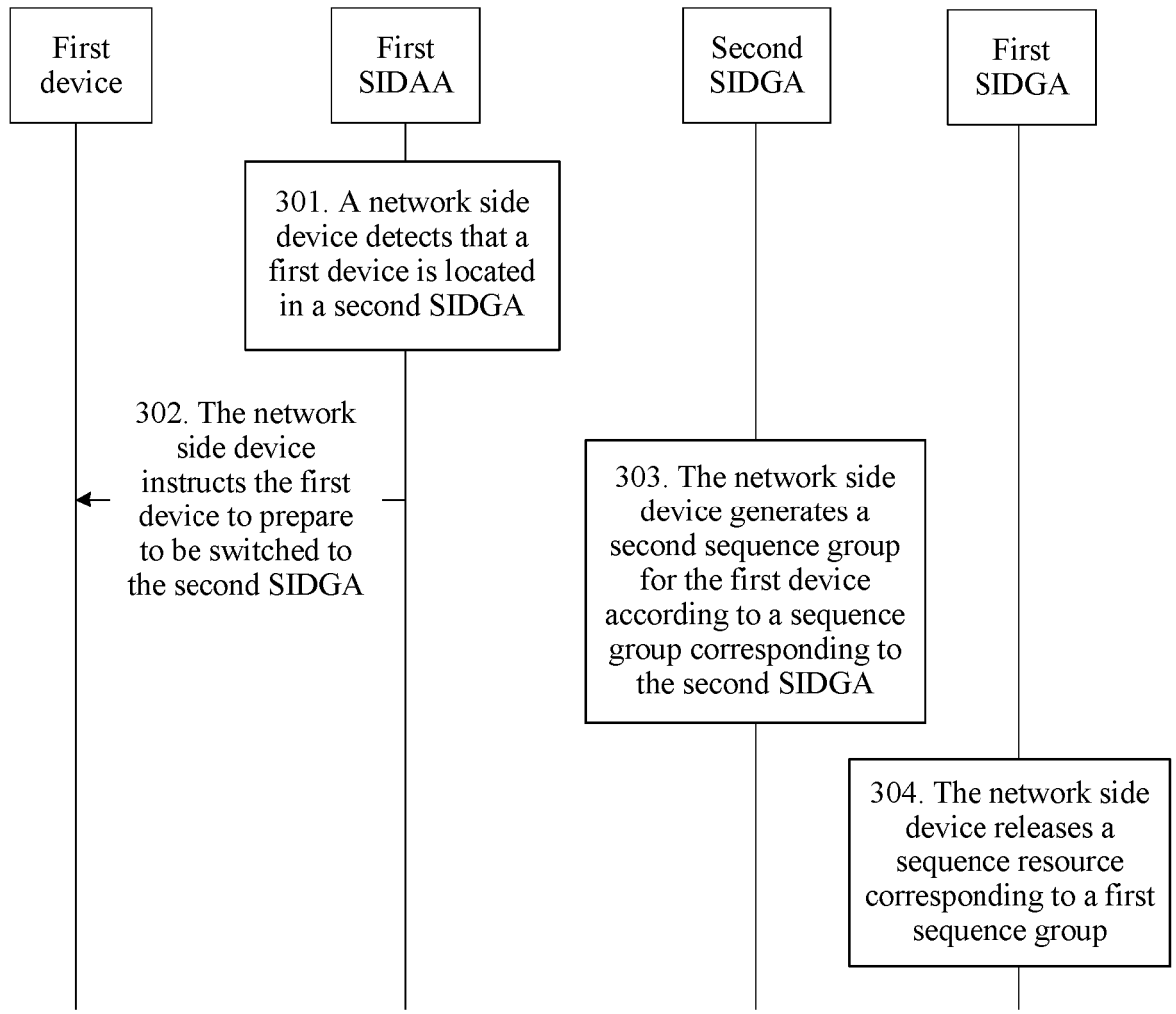
FIG. 6A is a signaling diagram of sequence group assignment performed when a network side device determines that a first device moves between different SIDGAs in a same SIDAA in a sequence configuration method according to the present invention.
Figure 6B:
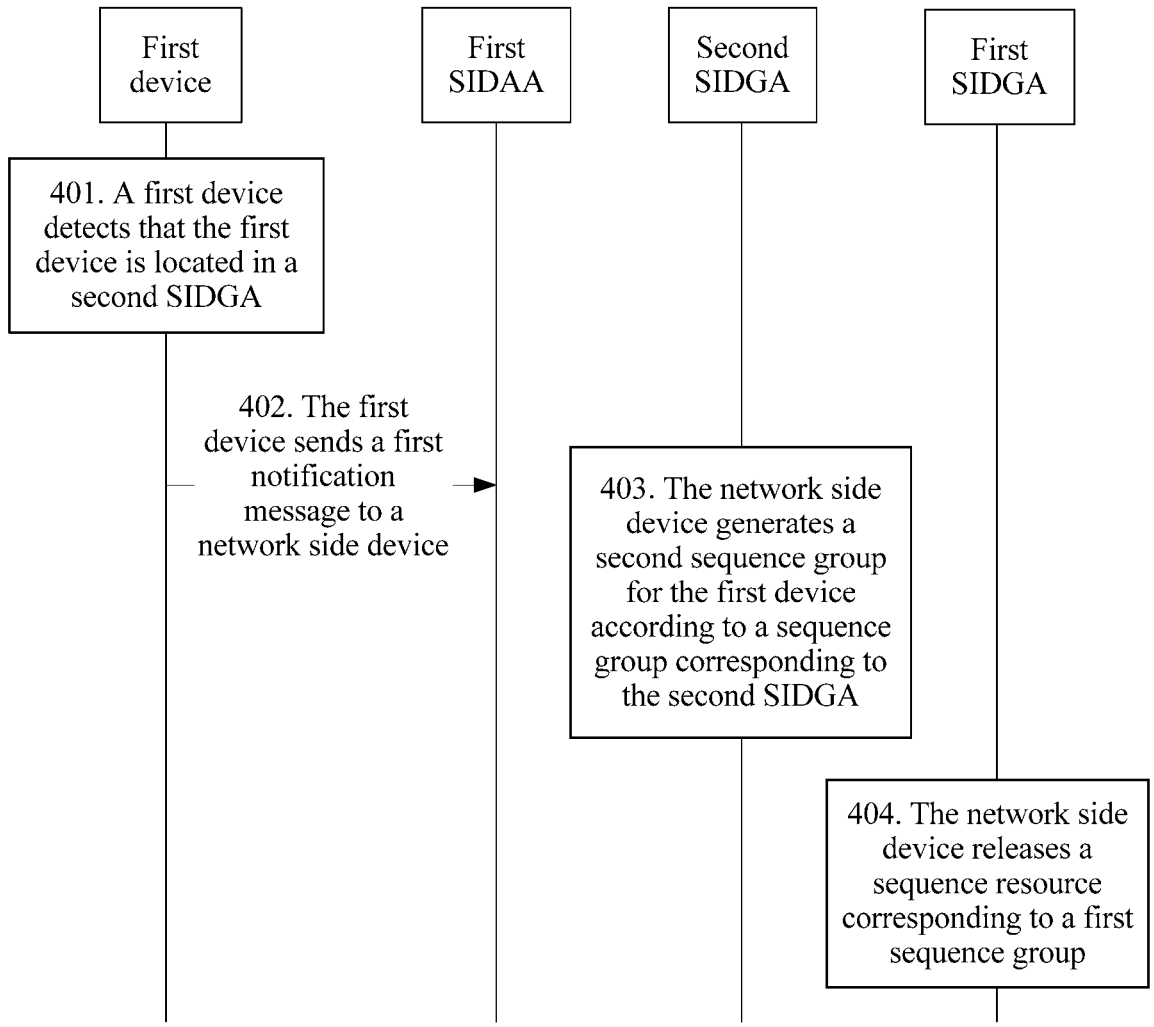
FIG. 6B is a signaling diagram of sequence group assignment performed when a first device determines that the first device moves between different SIDGAs in a same SIDAA in a sequence configuration method according to the present invention.

Referring to FIG. 6A, in this embodiment, a network side device determines that a first device moves from a first SIDGA to a second SIDGA, and the first SIDGA and the second SIDGA belong to a same SIDAA. Specifically, this embodiment includes the following steps.

301. The network side device detects that the first device is located in a second SIDGA.

During initialization, the first device is located in a first SIDGA. After a period of time, the network side device detects that the first device moves to the second SIDGA.

302. The network side device instructs the first device to prepare to be switched to the second SIDGA.

303. The network side device generates a second sequence group for the first device according to a sequence group corresponding to the second SIDGA.

Generally, all SIDAAs correspond to different network side devices, and all SIDGAs included in each SIDAA also correspond to different network side devices. For an SIDAA, a network device corresponding to the SIDAA may manage network devices corresponding to all SIDGAs included in the SIDAA. Certainly, a network device corresponding to each SIDGA may also be disposed according to a requirement. For example, all SIDGAs correspond to a same network device. For another example, all SIDAGs included in a same SIDAA correspond to a same network device. In this step, if a network side device corresponding to the first SIDGA and a network side device corresponding to the second SIDGA are a same network device, the network side device directly configures a sequence group for the first device. Otherwise, if the first SIDGA, the second SIDGA, and the first SIDAA correspond to different network devices, and a network device corresponding to the first SIDAA can manage network devices corresponding to the first SIDGA and the second SIDGA, in this step, the network side device corresponding to the first SIDAA sends a notification message to the network side device corresponding to the second SIDGA, so that the network side device corresponding to the second SIDGA configures a sequence group for the first device. Therefore, in the following embodiments, if there is no special description, the present invention is described in detail by using an example in which network devices corresponding to all SIDGAs are a same network device.

304. The network side device releases a sequence resource corresponding to a first sequence group.

In this step, the network side device releases a sequence resource occupied by the first device in the first SIDGA, that is, the first sequence group, so that when other first devices are located in the first SIDGA subsequently, the sequence resource corresponding to the first sequence group may be assigned to these first devices.

Referring to FIG. 6B, in this embodiment, a first device determines that the first device moves from a first SIDGA to a second SIDGA, and the first SIDGA and the second SIDGA belong to a same SIDAA. Specifically, this embodiment includes the following steps.

401. The first device detects that the first device is located in a second SIDGA.

During initialization, the first device is located in the first SIDGA. After a period of time, the first device detects that the first device moves to the second SIDGA.

402. The first device sends a first notification message to a network side device.

The first notification message indicates that the first device is located in the second sub-area, and a sequence group of the first device is the first sequence group.

403. The network side device generates a second sequence group for the first device according to a sequence group corresponding to the second SIDGA.

404. The network side device releases a sequence resource corresponding to a first sequence group.

In a second case, a first device moves between SIDGAs in different SIDAAs.

In this case, a first device initially located in a first SIDGA in a first SIDAA moves to a third SIDGA in a second SIDAA. Specifically, referring to FIG. 7A and FIG. 7B, FIG. 7A is a signaling diagram of sequence group assignment performed when a network side device determines that a first device moves between SIDGAs in different SIDAAs in a sequence configuration method according to the present invention, and FIG. 7B is a signaling diagram of sequence group assignment performed when a first device determines that the first device moves between different SIDGAs in different SIDAAs in a sequence configuration method according to the present invention.

Figure 7A:
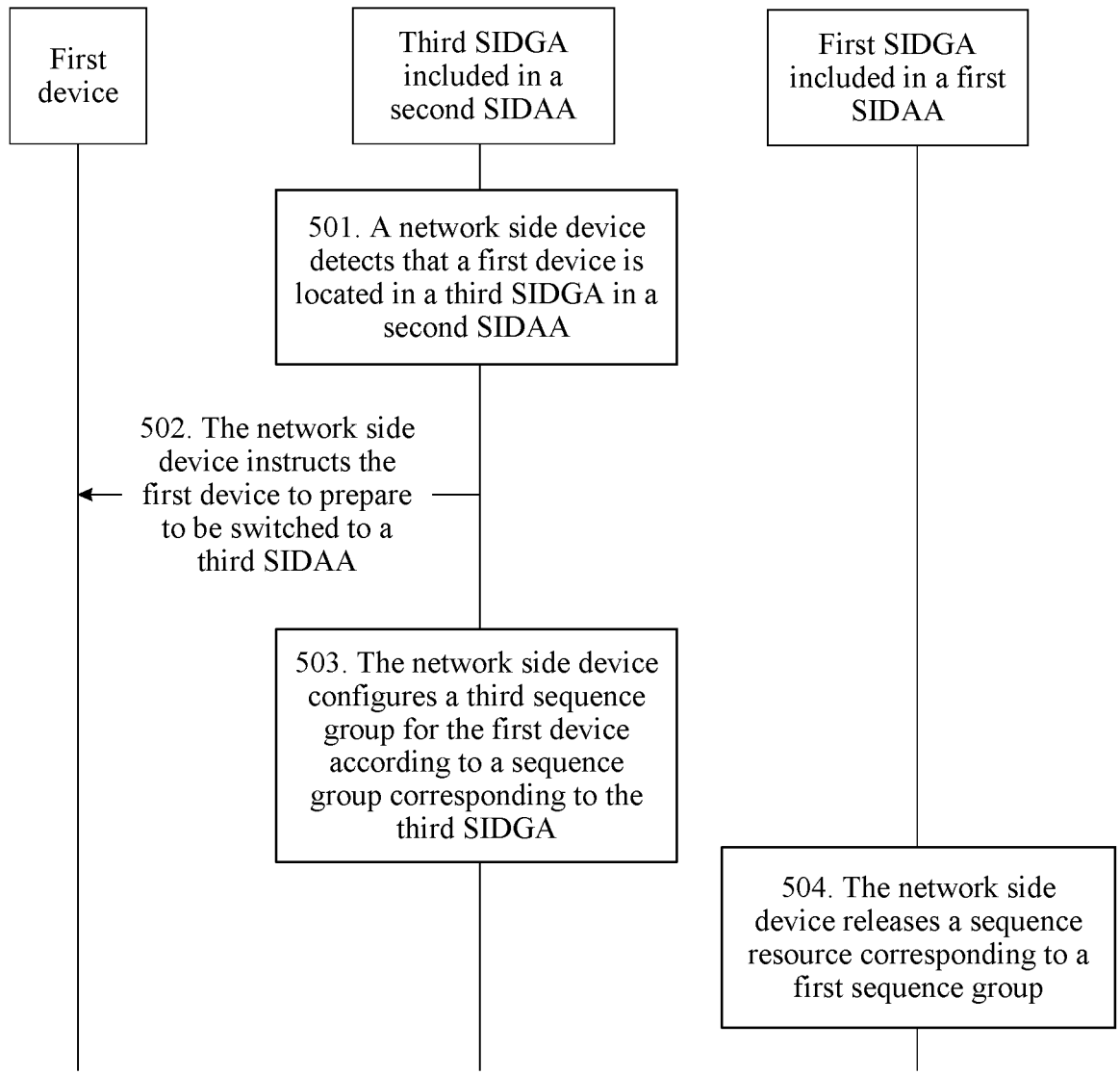
FIG. 7A is a signaling diagram of sequence group assignment performed when a network side device determines that a first device moves between SIDGAs in different SIDAAs in a sequence configuration method according to the present invention.
Figure 7B:
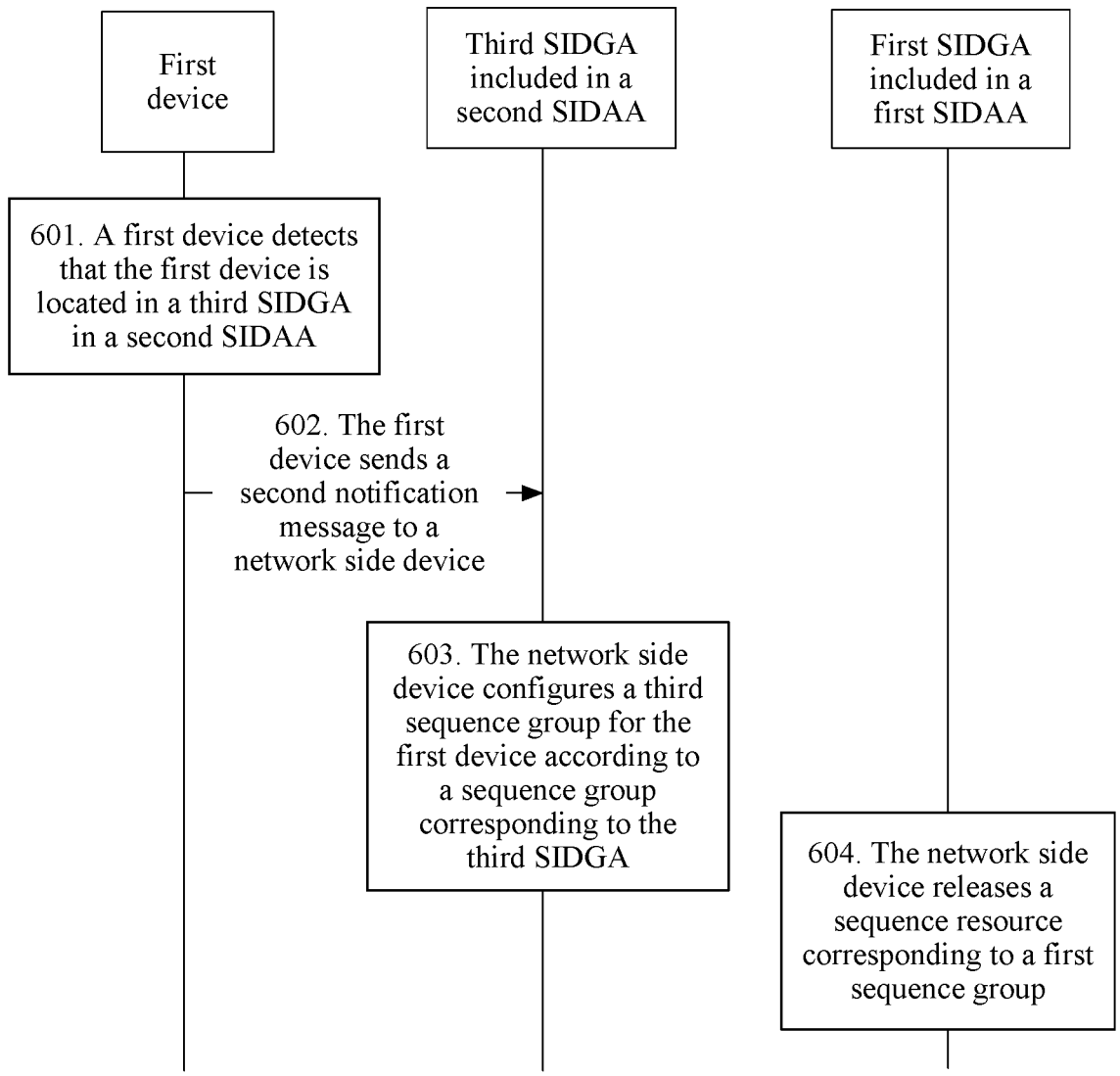
FIG. 7B is a signaling diagram of sequence group assignment performed when a first device determines that the first device moves between different SIDGAs in different SIDAAs in a sequence configuration method according to the present invention.

Referring to FIG. 7A, in this embodiment, a network side device determines that a first device moves from a first SIDGA in a first SIDAA to a third SIDGA in a second SIDAA. Specifically, this embodiment includes the following steps.

501. The network side device detects that the first device is located in a third SIDGA in a second SIDAA.

During initialization, the first device is located in a first SIDGA in a first SIDAA. After a period of time, the network side device detects that the first device moves to the third SIDGA in the second SIDAA.

502. The network side device instructs the first device to prepare to be switched to a third SIDAA.

503. The network side device configures a third sequence group for the first device according to a sequence group corresponding to the third SIDGA.

504. The network side device releases a sequence resource corresponding to a first sequence group.

Referring to FIG. 7B, in this embodiment, a first device determines that the first device moves from a first SIDGA in a first SIDAA to a third SIDGA in a second SIDAA. Specifically, this embodiment includes the following steps.

601. The first device detects that the first device is located in a third SIDGA in a second SIDAA.

During initialization, the first device is located in a first SIDGA in a first SIDAA. After a period of time, the first device detects that the first device moves to the third SIDGA in the second SIDAA.

602. The first device sends a second notification message to a network side device.

The second notification message indicates that the first device is located in the third sub-area, and a sequence group of the first device is the first sequence group.

603. The network side device generates a third sequence group for the first device according to a sequence group corresponding to the third SIDGA.

604. The network side device releases a sequence resource corresponding to a first sequence group.

In a third case, a first device is in an initialization procedure.

Figure 8:
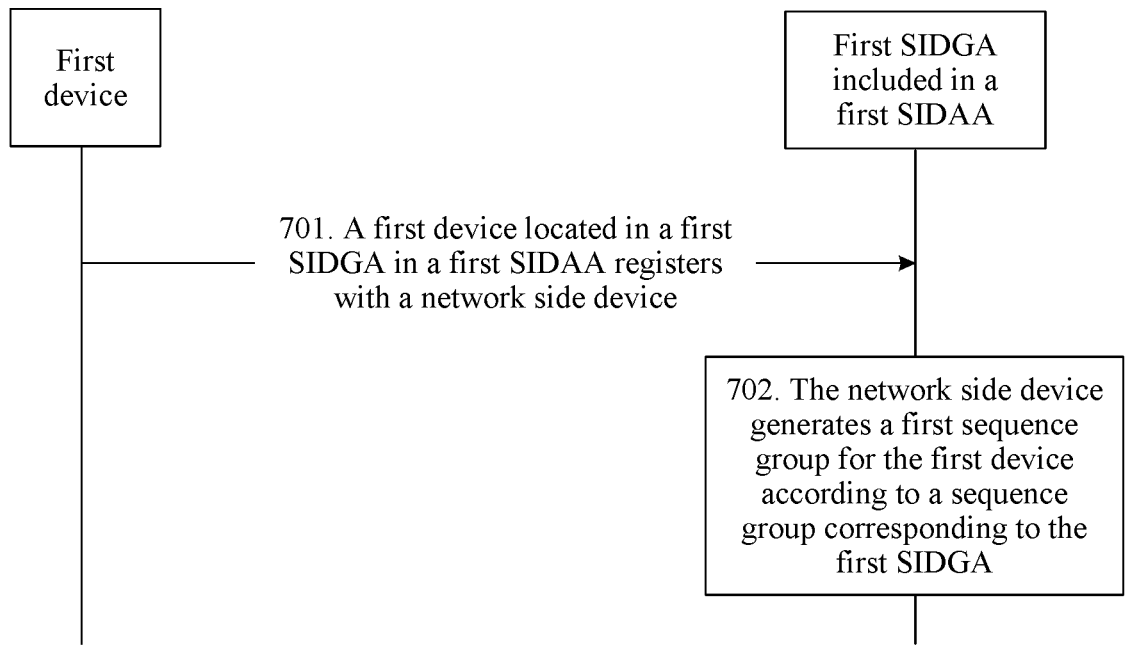
FIG. 8 is a signaling diagram of sequence group assignment performed when a first device is being initialized in a sequence configuration method according to the present invention.

If a first device is located in a first SIDGA in a first SIDAA during initialization, for a process of assigning a first sequence group to the first device, refer to FIG. 8. FIG. 8 is a signaling diagram of sequence group assignment performed when a first device is being initialized in a sequence configuration method according to the present invention, and FIG. 8 includes the following steps.

701. The first device located in a first SIDGA in a first SIDAA registers with a network side device.

In this embodiment, the first device is a first device for which no sequence group is configured initially, and the first device registers with the network side device during startup initialization.

702. The network side device generates a first sequence group for the first device according to a sequence group corresponding to the first SIDGA.

In a fourth case, a procedure of releasing a sequence resource when a first device is being powered off or is prohibited from being connected to a second device is performed.

Figure 9:
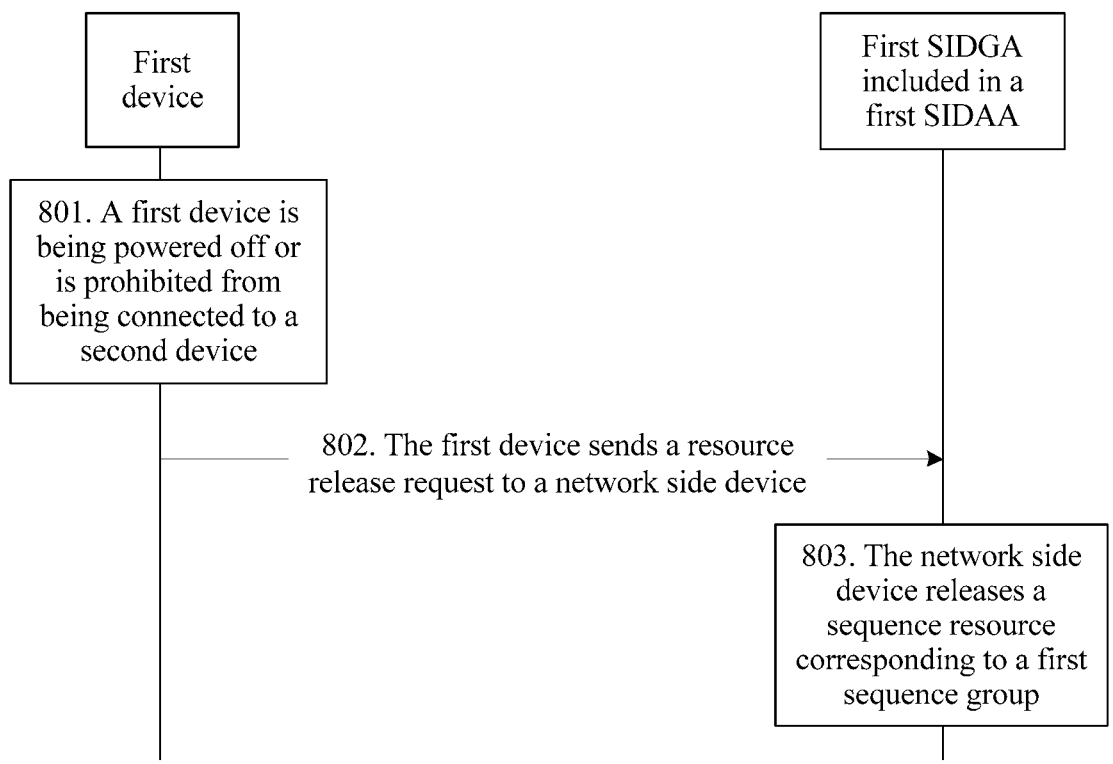
FIG. 9 is a signaling diagram of sequence resource release performed when a first device is being powered off in a sequence configuration method according to the present invention.

A first device is located in a first SIDGA in a first SIDAA, and a configured sequence group is a first sequence group. When the first device is being powered off or is prohibited from being connected to a second device, for a sequence resource release procedure, refer to FIG. 9. FIG. 9 is a signaling diagram of sequence resource release performed when a first device is being powered off in a sequence configuration method according to the present invention, and FIG. 9 includes the following steps:

801. The first device is being powered off or is prohibited from being connected to a second device.

802. The first device sends a resource release request to a network side device.

803. The network side device releases a sequence resource corresponding to a first sequence group.

In a fifth case, a procedure of releasing a sequence resource when a first device cannot be connected to a network side device is performed.

A first device is located in a first SIDGA in a first SIDAA, and a configured sequence group is a first sequence group.

Figure 10:
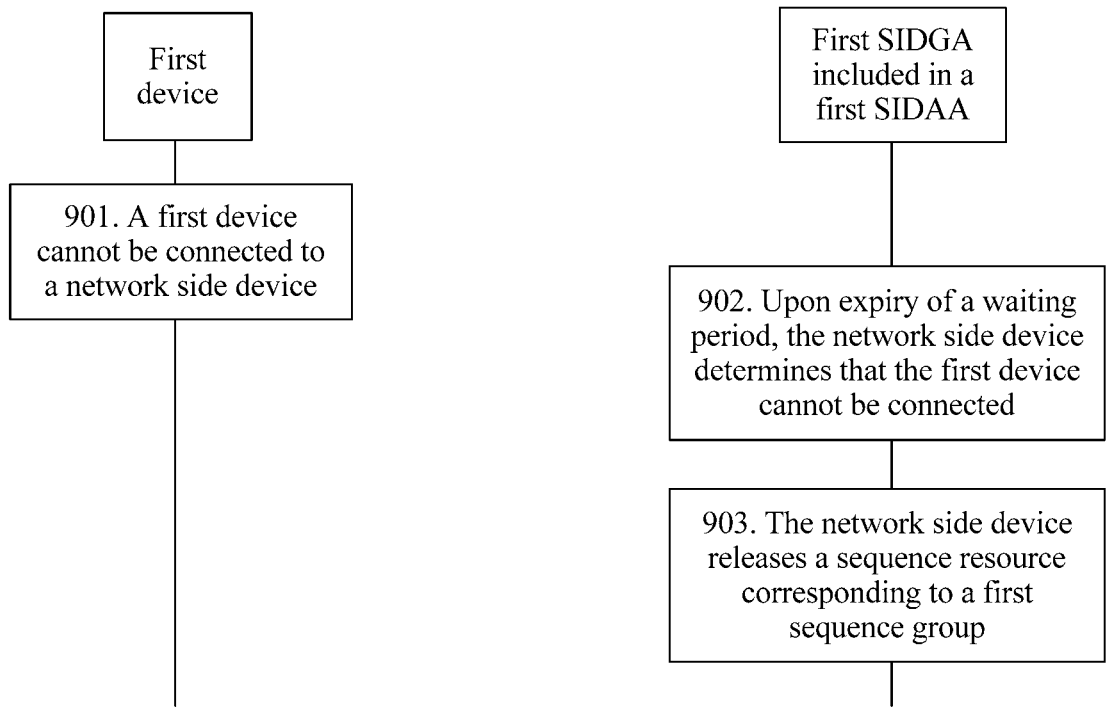
FIG. 10 is a signaling diagram of sequence resource release performed when a first device cannot be connected to a network side device in a sequence configuration method according to the present invention.

When the first device cannot be connected to a network side device, for a sequence resource release procedure, refer to FIG. 10. FIG. 10 is a signaling diagram of sequence resource release performed when a first device cannot be connected to a network side device in a sequence configuration method according to the present invention, and FIG. 10 includes the following steps:

901. The first device cannot be connected to the network side device.

902. Upon expiry of a waiting period, the network side device determines that the first device cannot be connected.

903. The network side device releases a sequence resource corresponding to a first sequence group.

In this step, the first SIDAA instructs the first SIDGA to release a sequence resource occupied by the first device, that is, the first sequence group.

Finally, a format of a sequence group is described as follows:

A sequence format used in an existing D2D communication scenario is first described. Specifically, referring to FIG. 11A and FIG. 11B, FIG. 11A is a schematic diagram of a format of a normal cyclic prefix subframe carrying a sequence in the prior art, and FIG. 11B is a schematic diagram of a format of an extended cyclic prefix subframe carrying a sequence in the prior art.

Figure 11A:
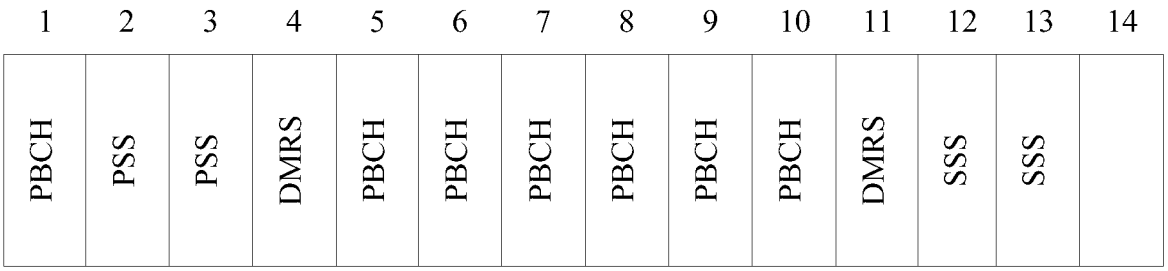
FIG. 11A is a schematic diagram of a format of a normal cyclic prefix subframe carrying a sequence in the prior art.

Referring to FIG. 11A, a normal cyclic prefix (Normal Cyclic Prefix, NCP) subframe includes 14 (1 to 14) symbols. The 14 symbols include two symbols for placing a primary synchronization signal (Primary Synchronization Signal, PSS), two symbols for placing a secondary synchronization signal (Secondary Synchronization Signal, SSS), two symbols for placing a demodulation reference signal (Demodulation Reference Signal, DMRS), seven symbols for placing a physical broadcast channel (Physical Broadcast Channel, PBCH), and one symbol that is not transmitted on a channel (that is, a fourteenth symbol).

The symbols for placing a PSS are a second symbol and a third symbol, the symbols for placing an SSS are a twelfth symbol and a thirteenth symbol, and the fourteenth symbol is not transmitted on a channel (a D2D standard specifies that, to avoid interference to a base station signal, the fourteenth symbol is not allowed to be transmitted on a channel). Both the PSS and the SSS are sequences. The PSS has three different sequences, and the SSS has 168 different sequences. Therefore, there are 3×3×168×168=254016 sequences in total.

Figure 11B:
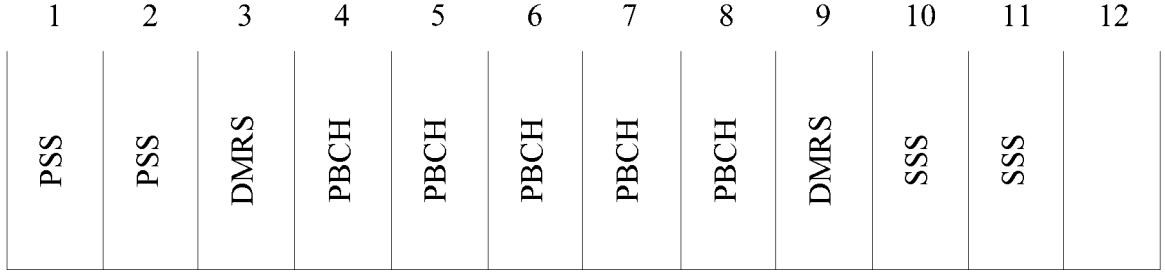
FIG. 11B is a schematic diagram of a format of an extended cyclic prefix subframe carrying a sequence in the prior art.

Referring to FIG. 11B, an extended cyclic prefix (Extend Cyclic Prefix, ECP) subframe includes 12 (1 to 12) symbols. Similarly, the 12 symbols include two symbols for placing a PSS and two symbols for placing an SSS, and further include two symbols for placing a DMRS, five symbols for placing a PBCH, and one symbol that is not transmitted on a channel (that is, a twelfth symbol). The symbols for placing a PSS are a first symbol and a second symbol, the symbols for placing an SSS are a tenth symbol and an eleventh symbol, and the twelfth symbol is not transmitted on a channel (a D2D standard specifies that, to avoid interference to a base station signal, the twelfth symbol is not allowed to be transmitted on a channel). Both the PSS and the SSS are sequences. The PSS has three different sequences, and the SSS has 168 different sequences. Therefore, there are 3×3×168×168=254016 sequences in total.

It may be learned from FIG. 11A and FIG. 11B that, if a sequence group of each first device includes N orthogonal sequences, and N=10, in this sequence format, 25401 first devices can be supported. This is far behind a quantity of existing first devices. Therefore, the sequence format needs to be re-designed.

In addition, for example, when a first device pages a second device that is subordinate to the first device, and another adjacent first device performs a D2D service nearby, a collision is caused if the two first devices simultaneously send a same sequence at a same frequency. Therefore, to avoid a collision between first devices that are close to each other over a sequence group, when a sequence is being designed, it is optimal to ensure that the sequence is orthogonal to a sequence group in an existing D2D communication scenario.

Based on FIG. 11A and FIG. 11B, the following provides a detailed description of a sequence format in an embodiment of the present invention.

In the foregoing embodiments, that the network side device sends the first sequence group to the first device and the second device is specifically: the network side device sends, to the first device and the second device, identifiers of the N mutually orthogonal sequences included in the first sequence group, so that the first device and the second device generate, according to the identifiers of the N mutually orthogonal sequences, a subframe carrying at least one first sequence, where the first sequence is one of the sequences included in the first sequence group. When the subframe is a normal cyclic prefix subframe, the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe. When the subframe is an extended cyclic prefix subframe, the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

Specifically, each second device has an independent exclusive paging sequence. Therefore, as a quantity of second devices increases, a quantity of required paging sequences increases accordingly. To adapt to the increase in the second devices, a symbol that is in a subframe and that is used to place a paging sequence needs to be added. It may be learned from FIG. 11A and FIG. 11B that, four symbols are used to place a PSS and an SSS in FIG. 11A and FIG. 11B. In this embodiment of the present invention, five or six symbols (that is, locations of the symbols occupied by the at least one first sequence) are used to place a PSS and an SSS. In addition, the five or six symbols for placing a PSS and an SSS need to be kept away from existing locations of symbols for placing a PSS and an SSS. In the present invention, the PSS and the SSS are collectively referred to as a synchronization signal (Synchronization Signal, SS). That is, locations for placing an SS sequence may be used to place a PSS, an SSS, or another sequence. This is not specifically limited in the present invention. The following uses a paging sequence as an example to describe the sequence format in the present invention in detail, and in this example, six symbols are used to place an SS.

When six symbols are used to place an SS, if three of the six symbols are used to place a PSS, the other three symbols are used to place an SSS. The PSS has three different sequences, and the SSS has 168 different sequences. Therefore, in a subframe, there are 3×3×3×168×168×168=128,024,064 sequences in total. If 10 sequences (nine paging sequences and one synchronization sequence) need to be configured for one first device, an area (that is, an SIDAA) may include 12,802,406 first devices.

When six symbols are used to place an SS, if two of the six symbols are used to place a PSS, the other four symbols are used to place an SSS. The PSS has three different sequences, and the SSS has 168 different sequences. Therefore, in a subframe, there are 3×3×168×168×168×168=7,169,347,584 sequences in total. If 10 sequences (nine paging sequences and one synchronization sequence) need to be configured for one first device, an area (that is, an SIDAA) may include 716,934,758 first devices.

Figure 12A:
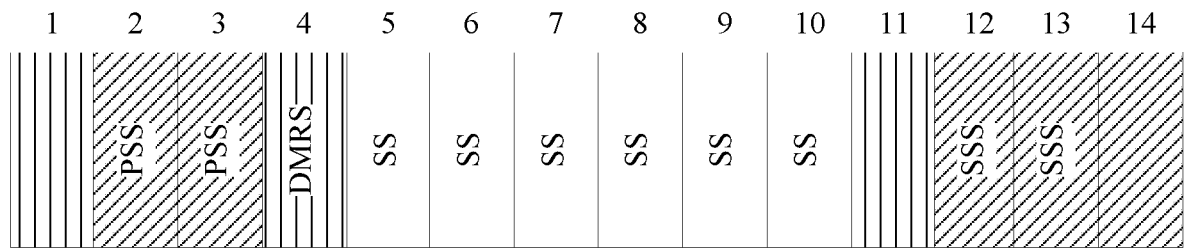
FIG. 12A is a schematic diagram of a format of an NCP subframe that carries a sequence and to which a sequence configuration method is applicable according to the present invention.

With reference to FIG. 11A and FIG. 11B, to ensure that the five or six symbols for placing an SS in this embodiment are kept away from the existing locations of the symbols for placing a PSS and an SSS, for an NCP subframe, second, third, twelfth, and thirteenth subframes cannot be used as the five or six symbols for placing an SS. In addition, to meet the rule in the D2D standard that the fourteenth symbol is not transmitted on a channel, for the NCP subframe, possible locations of the five or six symbols for placing an SS in this embodiment of the present invention are five or six symbols in first, fourth, fifth, sixth, seventh, ninth, tenth, and eleventh symbols, that is, permutations and combinations of these locations. For details, refer to FIG. 12A to FIG. 12D. FIG. 12A is a schematic diagram of a format of an NCP subframe that carries a sequence and to which a sequence configuration method is applicable according to the present invention, FIG. 12B is a schematic diagram of a format of another NCP subframe that carries a sequence and to which a sequence configuration method is applicable according to the present invention, FIG. 12C is a schematic diagram of a format of still another NCP subframe that carries a sequence and to which a sequence configuration method is applicable, and FIG. 12D is a schematic diagram of a format of yet another NCP subframe that carries a sequence and to which a sequence configuration method is applicable according to the present invention.

Referring to FIG. 12A, symbols filled by slashes, that is, second, third, twelfth, thirteenth, and fourteenth symbols, are locations that cannot be occupied by the five or six symbols for placing an SS in this embodiment. Symbols filled by vertical lines, that is, first, fourth, and eleventh symbols, are symbols used for a transmission signal, a reference signal, or the like. Non-filled symbols, that is, fifth to tenth symbols, are symbols on which five or six SSs in this embodiment may be placed.

Figure 12B:
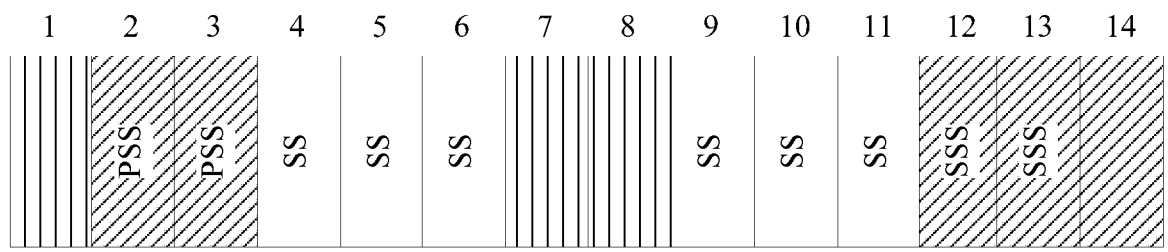
FIG. 12B is a schematic diagram of a format of another NCP subframe that carries a sequence and to which a sequence configuration method is applicable according to the present invention.

Referring to FIG. 12B, symbols filled by slashes, that is, second, third, twelfth, thirteenth, and fourteenth symbols, are locations that cannot be occupied by the five or six symbols for placing an SS in this embodiment. Symbols filled by vertical lines, that is, first, seventh, and eighth symbols, are symbols used for a transmission signal, a reference signal, or the like. Non-filled symbols, that is, fourth, fifth, sixth, ninth, tenth, and eleventh symbols, are symbols on which five or six SSs in this embodiment may be placed.

Figure 12C:
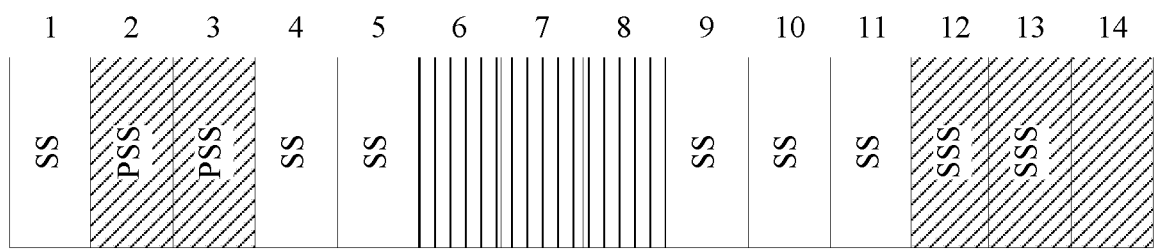
FIG. 12C is a schematic diagram of a format of still another NCP subframe that carries a sequence and to which a sequence configuration method is applicable.
Figure 12D:
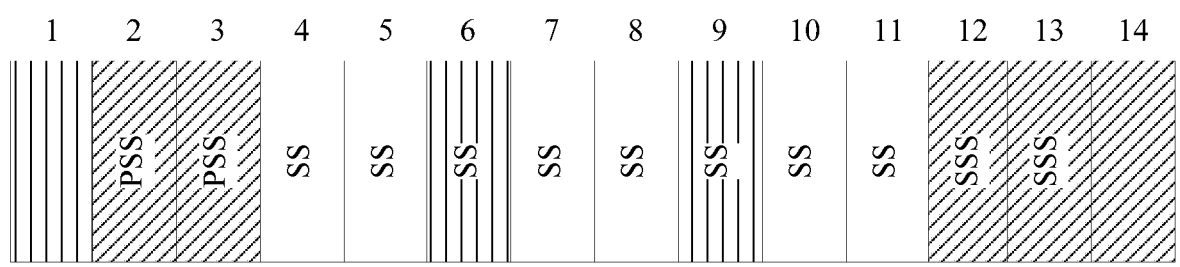
FIG. 12D is a schematic diagram of a format of yet another NCP subframe that carries a sequence and to which a sequence configuration method is applicable according to the present invention.

Referring to FIG. 12C, symbols filled by slashes, that is, second, third, twelfth, thirteenth, and fourteenth symbols, are locations that cannot be occupied by the five or six symbols for placing an SS in this embodiment. Symbols filled by vertical lines, that is, sixth, seventh, and eighth symbols, are symbols used for a transmission signal, a reference signal, or the like. Non-filled symbols, that is, first, fourth, fifth, ninth, tenth, and eleventh symbols, are symbols on which five or six SSs in this embodiment may be placed.

Referring to FIG. 12D, symbols filled by slashes, that is, second, third, twelfth, thirteenth, and fourteenth symbols, are locations that cannot be occupied by the five or six symbols for placing an SS in this embodiment. Symbols filled by vertical lines, that is, sixth, seventh, and eighth symbols, are symbols used for a transmission signal, a reference signal, or the like. Non-filled symbols, that is, first, fourth, fifth, ninth, tenth, and eleventh symbols, are symbols on which five or six SSs in this embodiment may be placed.

It should be noted that, an example in which six symbols are used to place an SS is used in FIG. 12A to FIG. 12D, and the present invention is not limited thereto. In another feasible implementation, a quantity of symbols for placing an SS may be 4, 5, or the like. In addition, FIG. 12A to FIG. 12D merely show several examples, and the present invention is not limited thereto.

In addition, all fourteenth symbols in FIG. 12A to FIG. 12D are locations that are prohibited from being occupied by a symbol for placing an SS. However, the present invention is not limited thereto. In another feasible implementation, for example, when the D2D rule is not followed, the fourteenth symbol may be occupied by a symbol for placing an SS, that is, possible locations of the five or six symbols for placing an SS are five or six symbols in first, fourth, fifth, sixth, seventh, ninth, tenth, eleventh, and fourteenth symbols.

In addition, it should be further noted that, in the foregoing embodiments, the five or six symbols in this embodiment are kept away from locations of symbols for placing a PSS and an SSS in the prior art. However, the present invention is not limited thereto. In another feasible implementation, the five or six symbols in this embodiment may occupy the locations of the symbols for placing a PSS and an SSS in the prior art, that is, possible locations of the five or six symbols for placing an SS sequence are five or six symbols in first, second, third, fourth, fifth, sixth, seventh, ninth, tenth, eleventh, twelfth, thirteenth, and fourteenth symbols.

In addition, it should be further noted that, in the foregoing embodiments, specifically, for a paging sequence, five or six symbols of a subframe are occupied to place an SS sequence. However, specifically, for a synchronization sequence, a quantity of symbols for placing an SS may be 4, 5, or 6. That is, in comparison with the paging sequence, one more possible solution in which fourth symbols are occupied is applicable to the synchronization sequence. That is, when the subframe is an NCP subframe, and the fourteenth subframe is not considered, possible locations of symbols for placing an SS used for a synchronization sequence are four, five, or six symbols in first, fourth, fifth, sixth, seventh, ninth, tenth, and eleventh symbols; when the subframe is an NCP subframe, and the fourteenth subframe is considered, possible locations of symbols for placing an SS are four, five, or six symbols in first, fourth, fifth, sixth, seventh, ninth, tenth, eleventh, and fourteenth symbols.

Figure 13A:
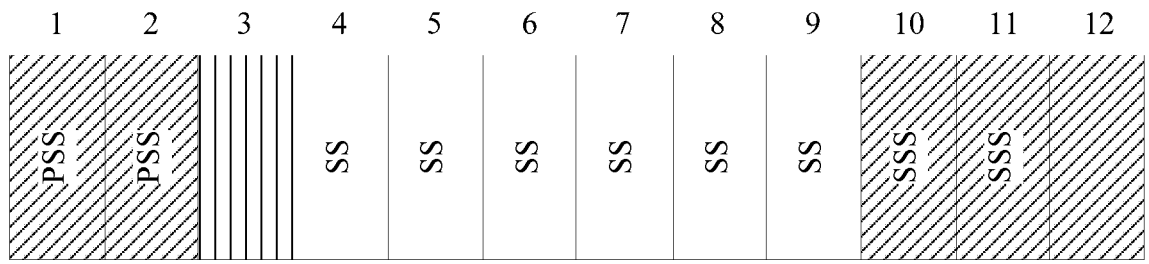
FIG. 13A is a schematic diagram of a format of an ECP subframe that carries a sequence and to which a sequence configuration method is applicable according to the present invention.

Still referring to FIG. 11A and FIG. 11B, to avoid that the five or six symbols for placing an SS sequence in this embodiment are kept away from the existing locations of the symbols for placing a PSS and an SSS, for an ECP subframe, first, second, tenth, and eleventh subframes cannot be used as added five or six symbols for placing an SS. In addition, to meet the rule in the D2D standard that the twelfth symbol is not transmitted on a channel, for the ECP subframe, possible locations of the five or six symbols for placing an SS in this embodiment of the present invention are five or six symbols in third, fourth, fifth, sixth, seventh, eighth, and ninth symbols, that is, permutations and combinations of these locations. For details, refer to FIG. 13A to FIG. 13D. FIG. 13A is a schematic diagram of a format of an ECP subframe that carries a sequence and to which a sequence configuration method is applicable according to the present invention, FIG. 13B is a schematic diagram of a format of another ECP subframe that carries a sequence and to which a sequence configuration method is applicable according to the present invention, FIG. 13C is a schematic diagram of a format of still another ECP subframe that carries a sequence and to which a sequence configuration method is applicable, and FIG. 13D is a schematic diagram of a format of yet another ECP subframe that carries a sequence and to which a sequence configuration method is applicable according to the present invention.

Referring to FIG. 13A, symbols filled by slashes, that is, first, second, tenth, eleventh, and twelfth symbols, are locations that cannot be occupied by the five or six symbols for placing an SS in this embodiment. A symbol filled by vertical lines, that is, third symbol, is a symbol used for a transmission signal, a reference signal, or the like. Non-filled symbols, that is, fourth to ninth symbols, are symbols on which five or six SSs in this embodiment may be placed.

Figure 13B:
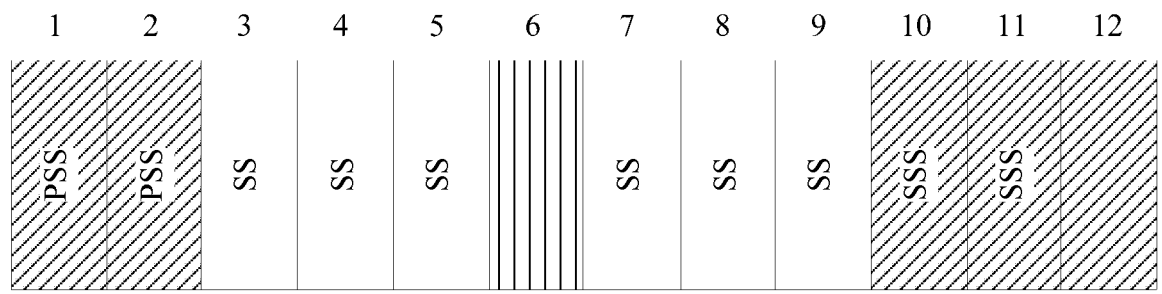
FIG. 13B is a schematic diagram of a format of another ECP subframe that carries a sequence and to which a sequence configuration method is applicable according to the present invention.

Referring to FIG. 13B, symbols filled by slashes, that is, first, second, tenth, eleventh, and twelfth symbols, are locations that cannot be occupied by the five or six symbols for placing an SS in this embodiment. A symbol filled by vertical lines, that is, a sixth symbol, is a symbol used for a transmission signal, a reference signal, or the like. Non-filled symbols, that is, third, fourth, fifth, seventh, eighth, and ninth symbols, are symbols on which five or six SSs in this embodiment may be placed.

Figure 13C:
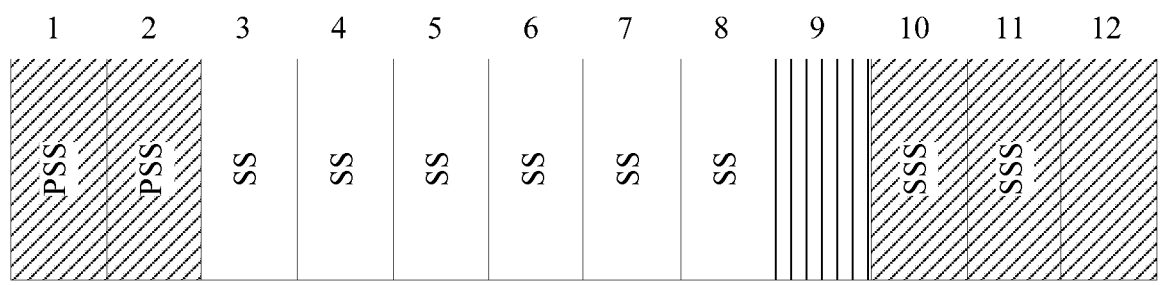
FIG. 13C is a schematic diagram of a format of still another ECP subframe that carries a sequence and to which a sequence configuration method is applicable.
Figure 13D:
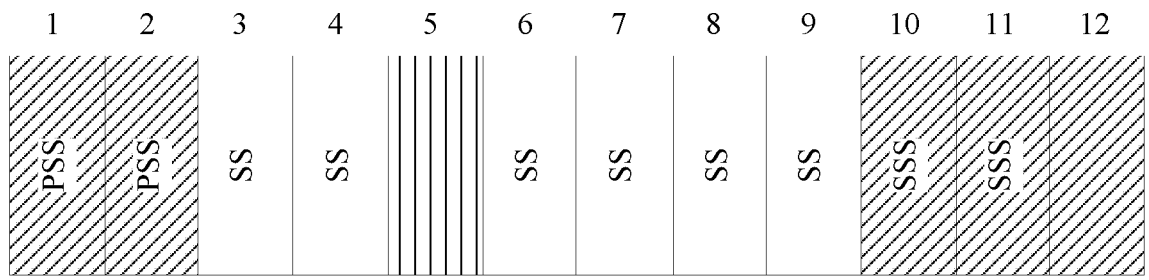
FIG. 13D is a schematic diagram of a format of yet another ECP subframe that carries a sequence and to which a sequence configuration method is applicable according to the present invention.

Referring to FIG. 13C, symbols filled by slashes, that is, first, second, tenth, eleventh, and twelfth symbols, are locations that cannot be occupied by the five or six symbols for placing an SS in this embodiment. A symbol filled by vertical lines, that is, a ninth symbol, is a symbol used for a transmission signal, a reference signal, or the like. Non-filled symbols, that is, third to eighth symbols, are symbols on which five or six SSs in this embodiment may be placed.

Referring to FIG. 13D, symbols filled by slashes, that is, first, second, tenth, eleventh, and twelfth symbols, are locations that cannot be occupied by the five or six symbols for placing an SS in this embodiment. A symbol filled by vertical lines, that is, a fifth symbol, is a symbol used for a transmission signal, a reference signal, or the like. Non-filled symbols, that is, third, fourth, sixth, seventh, eighth, and ninth symbols, are symbols on which five or six SSs in this embodiment may be placed.

It should be noted that, an example in which six symbols are used to place an SS is used in FIG. 13A to FIG. 13D, and the present invention is not limited thereto. In another feasible implementation, a quantity of symbols for placing an SS may be 4, 5, or the like. In addition, FIG. 13A to FIG. 13D merely show several examples, and the present invention is not limited thereto.

In addition, all twelfth symbols in FIG. 13A to FIG. 13D are locations that are prohibited from being occupied by a symbol for placing an SS. However, the present invention is not limited thereto. In another feasible implementation, for example, when the D2D rule is not followed, the twelfth symbol may be occupied by a symbol for placing an SS, that is, possible locations of the five or six symbols for placing an SS are five or six symbols in third, fourth, fifth, sixth, seventh, eighth, ninth, and twelfth symbols.

In addition, it should be further noted that, in the foregoing embodiments, the five or six symbols in this embodiment are kept away from locations of symbols for placing a PSS and an SSS in the prior art. However, the present invention is not limited thereto. In another feasible implementation, the five or six symbols in this embodiment may occupy the locations of the symbols for placing a PSS and an SSS in the prior art, that is, possible locations of the five or six symbols for placing an SS sequence are five or six symbols in first, second, third, fourth, fifth, sixth, seventh, eighth, ninth, tenth, eleventh, and twelfth symbols.

In addition, it should be further noted that, in the foregoing embodiments, specifically, for a paging sequence, six symbols of a subframe are occupied to place an SS sequence. However, specifically, for a synchronization sequence, a quantity of symbols for placing an SS may be 4, 5, or 6. That is, in comparison with the paging sequence, one more possible solution in which fourth symbols are occupied is applicable to the synchronization sequence. That is, when the subframe is an ECP subframe, and the twelfth subframe is not considered, possible locations of symbols for placing an SS used for a synchronization sequence are four, five, or six symbols in third, fourth, fifth, sixth, seventh, eighth, and ninth symbols; when the subframe is an ECP subframe, and the twelfth subframe is considered, possible locations of symbols for placing an SS are four, five, or six symbols in third, fourth, fifth, sixth, seventh, eighth, ninth, and twelfth symbols.

Figure 14:
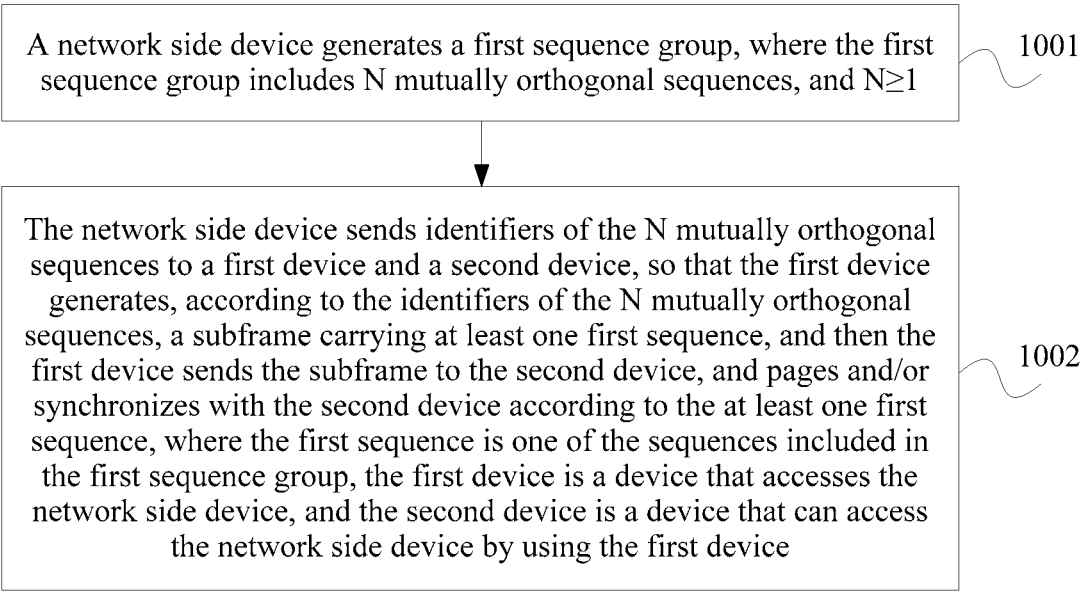
FIG. 14 is a flowchart of Embodiment 1 of a subframe generation method according to the present invention.

FIG. 14 is a flowchart of Embodiment 1 of a subframe generation method according to the present invention. This embodiment is performed by a network side device, and is applicable to a scenario in which a sequence group needs to be configured for a first device in device communication. Specifically, this embodiment includes the following steps.

1001. The network side device generates a first sequence group, where the first sequence group includes N mutually orthogonal sequences, and N≥1.

In this step, specifically, for descriptions of a subframe and the like, refer to FIG. 12A to FIG. 12D and FIG. 13A to FIG. 13D. Details are not described herein again.

1002. The network side device sends identifiers of the N mutually orthogonal sequences to the first device and a second device, so that the first device generates, according to the identifiers of the N mutually orthogonal sequences, a subframe carrying at least one first sequence, and then the first device sends the subframe to the second device, and pages and/or synchronizes with the second device according to the at least one first sequence, where the first sequence is one of the sequences included in the first sequence group, the first device is a device that accesses the network side device, and the second device is a device that can access the network side device by using the first device.

Specifically, the network side device generates the first sequence group for the second device according to a quantity of second devices connected to the first device, positions of the second devices, and the like. For example, if the first device determines that the second device is located in a first SIDGA in a first SIDAA, a sequence group assigned to the first SIDGA includes 20 mutually orthogonal sequences, and the first device is connected to 10 second devices, the network side device uses 11 of the 20 sequences of the first SIDGA as the first sequence group, and configures the first sequence group for the first device. 10 of the 11 sequences are used to page the second devices, and the other one is used to synchronize with the second devices. When a quantity of second devices connected to the first device increases, a sequence continues to be assigned to the first device according to an increment.

According to the sequence configuration method provided in this embodiment of the present invention, the network side device generates the first sequence group, and sends, to the first device and the second device, the identifiers of the N mutually orthogonal sequences included in the first sequence group, so that the first device generates, according to the identifiers of the N mutually orthogonal sequences, the subframe carrying the at least one first sequence, and pages and/or synchronizes with the second device by using the at least one first sequence. In this way, the first device pages or synchronizes with the second device according to a sequence, thereby implementing paging and synchronization for the second device in a device communication scenario.

In some embodiments, in an embodiment of the present invention, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe. For details, refer to FIG. 12A to FIG. 12D.

In some embodiments, in an embodiment of the present invention, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe. For details, refer to FIG. 13A to FIG. 13D.

In some embodiments, in an embodiment of the present invention, the sequence in the sequence group is a synchronization sequence, and the synchronization sequence includes a primary synchronization sequence and a secondary synchronization sequence.

Figure 15:
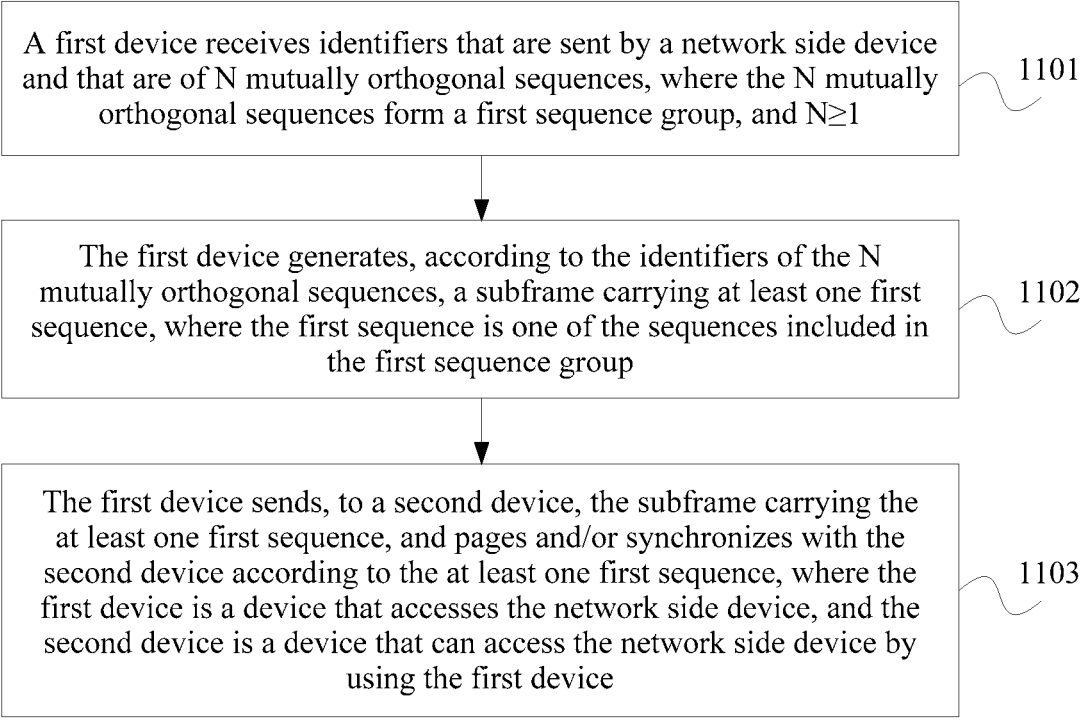
FIG. 15 is a flowchart of Embodiment 2 of a subframe generation method according to the present invention.

FIG. 15 is a flowchart of Embodiment 2 of a subframe generation method according to the present invention. This embodiment is performed by a first device, and is applicable to a scenario in which a sequence group needs to be configured for the first device in device communication. Specifically, this embodiment includes the following steps:

1101. The first device receives identifiers that are sent by a network side device and that are of N mutually orthogonal sequences, where the N mutually orthogonal sequences constitute a first sequence group, and N≥1.

1102. The first device generates, according to the identifiers of the N mutually orthogonal sequences, a subframe carrying at least one first sequence, where the first sequence is one of the sequences included in the first sequence group.

1103. The first device sends, to the second device, the subframe carrying the at least one first sequence, and pages and/or synchronizes with the second device according to the at least one first sequence, where the first device is a device that accesses the network side device, and the second device is a device that can access the network side device by using the first device.

According to the sequence configuration method provided in this embodiment of the present invention, the first device receives the identifiers that are sent by the network side device and that are of the N mutually orthogonal sequences; generates, according to the identifiers of the N mutually orthogonal sequences, the subframe carrying the at least one first sequence, where the first sequence is one of the sequences included in the first sequence group; and pages and/or synchronizes with the second device by using the at least one first sequence. In this way, the first device pages or synchronizes with the second device according to a sequence, thereby implementing paging and synchronization for the second device in a device communication scenario.

In some embodiments, in an embodiment of the present invention, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe. For details, refer to FIG. 12A to FIG. 12D.

In some embodiments, in an embodiment of the present invention, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe. For details, refer to FIG. 12A to FIG. 12D.

In some embodiments, in an embodiment of the present invention, the sequence in the sequence group is a synchronization sequence, and the synchronization sequence includes a primary synchronization sequence and a secondary synchronization sequence.

Figure 16:
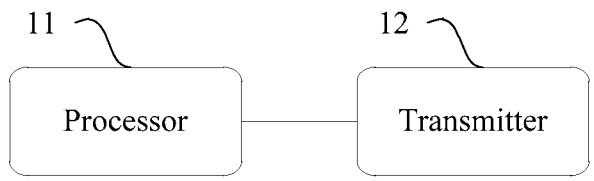
FIG. 16 is a schematic structural diagram of Embodiment 1 of a network side device according to the present invention.

FIG. 16 is a schematic structural diagram of Embodiment 1 of a network side device according to the present invention. The network side device provided in this embodiment is an apparatus embodiment corresponding to the embodiment in FIG. 2 of the present invention. A specific implementation process is not described herein again. Specifically, the network device provided in this embodiment includes: a processor 11, configured to generate a first sequence group, where the first sequence group is generated according to a sequence group corresponding to a first sub-area, the first sequence group includes N mutually orthogonal sequences, and N≥1; the first sub-area is one of X sub-areas included in a first area, the first area is one of Y areas, the Y areas are obtained after the network side device divides at least one cell, the X sub-areas are obtained after the network side device divides the first area, X≥1, and 1≤Y≤X; the sequence group corresponding to the first sub-area is configured by the network side device for the first sub-area after the network side device divides the first area; and a transmitter 12, configured to send, to a first device and a second device, the first sequence group generated by the processor 11, so that the first device pages and/or synchronizes with the second device by using the first sequence group, where the first device is user equipment located in the first sub-area and is a device that accesses the network side device, and the second device is a device that can access the network side device by using the first device.

According to the network side device provided in this embodiment of the present invention, based on area division, the network side device generates the first sequence group, and sends the first sequence group to the first device and the second device, so that the first device located in the first sub-area pages and/or synchronizes with the second device by using the first sequence group. In this way, the first device pages or synchronizes with the second device according to a sequence, thereby implementing paging for the second device.

In some embodiments, in an embodiment of the present invention, the processor 11 is further configured to: after the transmitter 12 sends the first sequence group to the first device, determine that the first device moves to a second sub-area, and keep a sequence group of the first device being configured to the first sequence group unchanged; or determine that the first device moves to a second sub-area, and send a second sequence group to the first device, where the second sequence group is generated according to a sequence group corresponding to the second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

Figure 17:
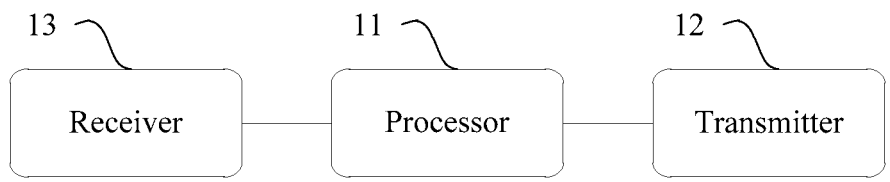
FIG. 17 is a schematic structural diagram of Embodiment 2 of a network device according to the present invention.

FIG. 17 is a schematic structural diagram of Embodiment 2 of a network device according to the present invention. As shown in FIG. 17, based on the structure in FIG. 16, the network device in this embodiment further includes:

a receiver 13, configured to: before the processor 11 determines that the first device moves to the second sub-area, receive a first notification message sent by the first device, where the first notification message indicates that the first device is located in the second sub-area, and the sequence group of the first device is the first sequence group.

In some embodiments, in an embodiment of the present invention, after the transmitter 12 sends the first sequence group to the first device, the processor 11 is further configured to:

determine that the first device moves to a third sub-area, and send a third sequence group to the first device, where the third sequence group is generated according to a sequence group corresponding to the third sub-area, the third sub-area is one of all sub-areas in a second area, the third sequence group includes N mutually orthogonal sequences, and the second area is one of areas other than the first area in the Y areas.

In some embodiments, in an embodiment of the present invention, the receiver 13 is configured to: before the processor 11 determines that the first device moves to the third sub-area, receive a second notification message sent by the first device, where the second notification message indicates that the first device is located in the third sub-area, and a sequence group of the first device is the first sequence group.

In some embodiments, in an embodiment of the present invention, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

In some embodiments, in an embodiment of the present invention, before generating the first sequence group, the processor 11 further divides the at least one cell to obtain the Y areas, and divides the first area to obtain the X sub-areas.

In some embodiments, in an embodiment of the present invention, sequences included in sequence groups corresponding to all the sub-areas included in the first area are mutually orthogonal.

In some embodiments, in an embodiment of the present invention, the transmitter 12 is specifically configured to send, to the first device and the second device, identifiers of the N mutually orthogonal sequences included in the first sequence group, so that the first device generates, according to the identifiers of the N mutually orthogonal sequences, a subframe carrying at least one first sequence, where the first sequence is one of the sequences included in the first sequence group.

In some embodiments, in an embodiment of the present invention, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In some embodiments, in an embodiment of the present invention, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the extended cyclic prefix subframe.

Figure 18:
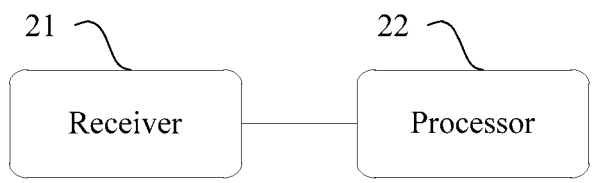
FIG. 18 is a schematic structural diagram of Embodiment 1 of a first device according to the present invention.

FIG. 18 is a schematic structural diagram of Embodiment 1 of a first device according to the present invention. The first device provided in this embodiment is an apparatus embodiment corresponding to the embodiment in FIG. 3 of the present invention. A specific implementation process is not described herein again. Specifically, the user equipment is a first device, and the first device includes:

a receiver 21, configured to receive a first sequence group sent by a network side device, where the first sequence group is generated according to a sequence group corresponding to a first sub-area, the first sequence group includes N mutually orthogonal sequences, and $N \geq 1$; the first sub-area is one of X sub-areas included in a first area, the first area is one of Y areas, the Y areas are obtained after the network side device divides at least one cell, the X sub-areas are obtained after the network side device divides the first area, $X \geq 1$, and $1 \leq Y \leq X$; the sequence group corresponding to the first sub-area is configured by the network device for the first sub-area after the network device divides the first area; and a processor 22, configured to page or synchronize with a second device by using the first sequence group received by the receiver 21, where the first device is user equipment located in the first sub-area and is a device that accesses the network side device, and the second device is a device that can access the network side device by using the first device.

According to the first device provided in this embodiment of the present invention, based on area division, the first device located in the first sub-area receives the first sequence group generated and sent by the network side device, and pages and/or synchronizes with the second device by using the first sequence group. In this way, the first device pages or synchronizes with the second device according to a sequence, thereby implementing paging for the second device.

In some embodiments, in an embodiment of the present invention, the receiver 21 is further configured to: after the processor 22 pages or synchronizes with the second device by using the first sequence group, receive a second sequence group sent by the network side device, where the second sequence group is generated according to a sequence group corresponding to a second sub-area, the second sub-area is one of sub-areas other than the first sub-area in the first area, the second sequence group includes N mutually orthogonal sequences, and a sequence included in the sequence group corresponding to the first sub-area and a sequence included in the sequence group corresponding to the second sub-area are mutually orthogonal.

Figure 19:
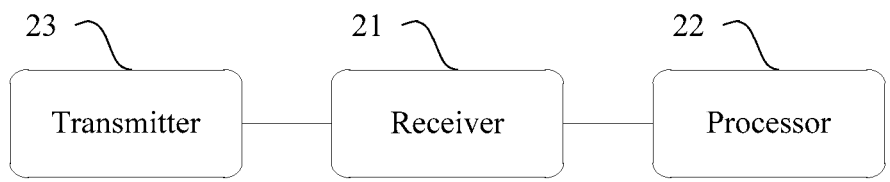
FIG. 19 is a schematic structural diagram of Embodiment 2 of a first device according to the present invention.

FIG. 19 is a schematic structural diagram of Embodiment 2 of a first device according to the present invention. As shown in FIG. 19, based on the structure in FIG. 18, the first device in this embodiment further includes:

a transmitter 23, configured to: before the receiver 21 receives the second sequence group sent by the network side device, send a first notification message to the network side device, where the first notification message indicates that the first device is located in the second sub-area, and a sequence group of the first device is the first sequence group.

In some embodiments, in an embodiment of the present invention, the receiver 21 is further configured to: after the processor 22 pages or synchronizes with the second device by using the first sequence group, receive a third sequence group sent by the network side device, where the third sequence group is generated according to a sequence group corresponding to a third sub-area, the third sub-area is one of all sub-areas in a second area, the third sequence group includes N mutually orthogonal sequences, and the second area is one of areas other than the first area in the Y areas.

In some embodiments, in an embodiment of the present invention, the transmitter 23 is configured to: before the receiver 21 receives the third sequence group sent by the network side device, send a second notification message to the network side device, where the second notification message indicates that the first device is located in the third sub-area, and a sequence group of the first device is the first sequence group.

In some embodiments, in an embodiment of the present invention, if the first sub-area in the first area is adjacent to the third sub-area in the second area, a sequence included in the sequence group corresponding to the first sub-area and a sequence included in the sequence group corresponding to the third sub-area are mutually orthogonal; or if the first sub-area in the first area is not adjacent to the third sub-area in the second area, a sequence included in the sequence group corresponding to the first sub-area and a sequence included in the sequence group corresponding to the third sub-area are mutually orthogonal or to be reused.

In some embodiments, in an embodiment of the present invention, sequences included in sequence groups corresponding to all the sub-areas included in the first area are mutually orthogonal.

In some embodiments, in an embodiment of the present invention, the receiver 21 is specifically configured to receive identifiers that are sent by the network side device and that are of the N mutually orthogonal sequences; and the processor 22 is specifically configured to: generate, according to the identifiers of the N mutually orthogonal sequences, a subframe carrying at least one first sequence, where the first sequence is one of the sequences included in the first sequence group; and send, to the second device, the subframe carrying the at least one first sequence, so as to page or synchronize with the second device by using the at least one first sequence.

Figure 20:
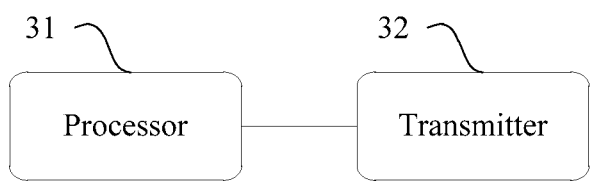
FIG. 20 is a schematic structural diagram of Embodiment 3 of a network side device according to the present invention.

FIG. 20 is a schematic structural diagram of Embodiment 3 of a network side device according to the present invention. The network side device provided in this embodiment is an apparatus embodiment corresponding to the embodiment in FIG. 14 of the present invention. A specific implementation process is not described herein again. Specifically, the network side device provided in this embodiment includes:

a processor 31, configured to generate a first sequence group, where the first sequence group includes N mutually orthogonal sequences, and N≥1; and a transmitter 32, configured to send, to the first device and a second device, identifiers of the N mutually orthogonal sequences included in the first sequence group generated by the processor 31, so that the first device generates, according to the identifiers of the N mutually orthogonal sequences, a subframe carrying at least one first sequence, and then the first device sends the subframe to the second device, and pages and/or synchronizes with the second device according to the at least one first sequence, where the first sequence is one of the sequences included in the first sequence group, the first device is a device that accesses the network side device, and the second device is a device that can access the network side device by using the first device.

The network side device provided in this embodiment of the present invention generates the first sequence group, and sends, to the first device and the second device, the identifiers of the N mutually orthogonal sequences included in the first sequence group, so that the first device generates, according to the identifiers of the N mutually orthogonal sequences, the subframe carrying the at least one first sequence, and pages and/or synchronizes with the second device by using the at least one first sequence. In this way, the first device pages or synchronizes with the second device according to a sequence, thereby implementing paging and synchronization for the second device in a device communication scenario.

In some embodiments, in an embodiment of the present invention, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In some embodiments, in an embodiment of the present invention, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

In some embodiments, in an embodiment of the present invention, the sequence is a synchronization sequence, and the synchronization sequence includes a primary synchronization sequence and a secondary synchronization sequence.

Figure 21:
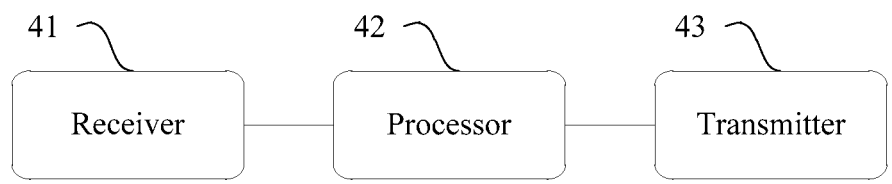
FIG. 21 is a schematic structural diagram of Embodiment 3 of a first device according to the present invention.

FIG. 21 is a schematic structural diagram of Embodiment 3 of a first device according to the present invention. The first device provided in this embodiment is an apparatus embodiment corresponding to the embodiment in FIG. 15 of the present invention. A specific implementation process is not described herein again. Specifically, the user equipment is a first device, and the first device includes:

a receiver 41, configured to receive identifiers that are sent by a network side device and that are of N mutually orthogonal sequences, where the N mutually orthogonal sequences constitute a first sequence group, and N≥1;

a processor 42, configured to generate, according to the identifiers that are received by the receiver 41 and that are of the N mutually orthogonal sequences, a subframe carrying at least one first sequence, where the first sequence is one of the sequences included in the first sequence group; and a transmitter 43, configured to: send, to the second device, the subframe that is generated by the processor 42 and that carries the at least one first sequence, and page and/or synchronize with the second device according to the at least one first sequence, where the first device is a device that accesses the network side device, and the second device is a device that can access the network side device by using the first device.

The first device provided in this embodiment of the present invention receives the identifiers that are sent by the network side device and that are of the N mutually orthogonal sequences; generates, according to the identifiers of the N mutually orthogonal sequences, the subframe carrying the at least one first sequence, where the first sequence is one of the sequences included in the first sequence group; and pages and/or synchronizes with the second device by using the at least one first sequence. In this way, the first device pages or synchronizes with the second device according to a sequence, thereby implementing paging and synchronization for the second device in a device communication scenario.

In some embodiments, in an embodiment of the present invention, the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

In some embodiments, in an embodiment of the present invention, the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the normal cyclic prefix subframe.

In some embodiments, in an embodiment of the present invention, the sequence is a synchronization sequence, and the synchronization sequence includes a primary synchronization sequence and a secondary synchronization sequence.

Figure 22:
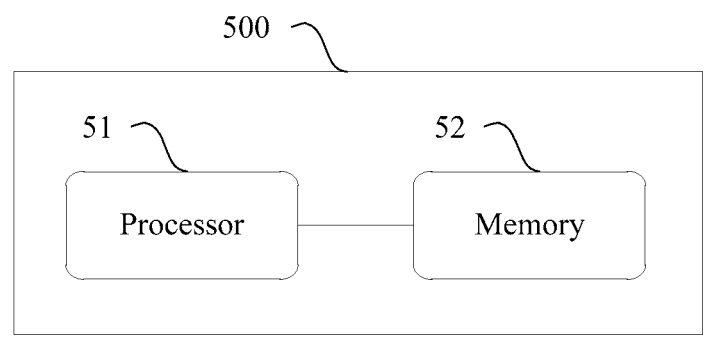
FIG. 22 is a schematic structural diagram of Embodiment 4 of a network side device according to the present invention.

FIG. 22 is a schematic structural diagram of Embodiment 4 of a network side device according to the present invention. As shown in FIG. 22, a network side device 500 provided in this embodiment includes a processor 51 and a memory 52. The memory 52 stores an execution instruction. When the network side device runs, the processor 51 communicates with the memory 52. The processor 51 invokes the execution instruction in the memory 52, so as to execute the method embodiment shown in FIG. 2. An implementation principle and a technical effect of this embodiment are similar to those of the method embodiment, and details are not described herein again.

Figure 23:
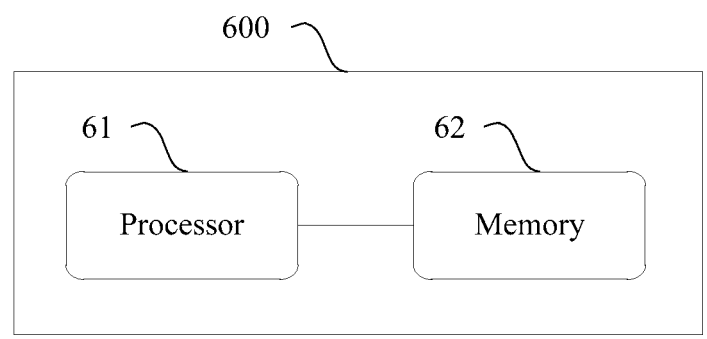
FIG. 23 is a schematic structural diagram of Embodiment 4 of a first device according to the present invention.

FIG. 23 is a schematic structural diagram of Embodiment 4 of a first device according to the present invention. As shown in FIG. 23, a first device 600 provided in this embodiment includes a processor 61 and a memory 62. The memory 62 stores an execution instruction. When the first device runs, the processor 61 communicates with the memory 62. The processor 61 invokes the execution instruction in the memory 62, so as to execute the method embodiment shown in FIG. 3. An implementation principle and a technical effect of this embodiment are similar to those of the method embodiment, and details are not described herein again.

Figure 24:
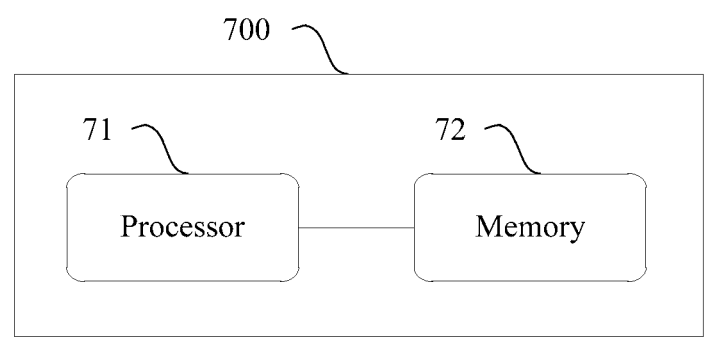
FIG. 24 is a schematic structural diagram of Embodiment 5 of a network side device according to the present invention.

FIG. 24 is a schematic structural diagram of Embodiment 5 of a network side device according to the present invention. As shown in FIG. 24, a network side device 700 provided in this embodiment includes a processor 71 and a memory 72. The memory 72 stores an execution instruction. When the network side device runs, the processor 71 communicates with the memory 72. The processor 71 invokes the execution instruction in the memory 72, so as to execute the method embodiment shown in FIG. 14. An implementation principle and a technical effect of this embodiment are similar to those of the method embodiment, and details are not described herein again.

Figure 25:
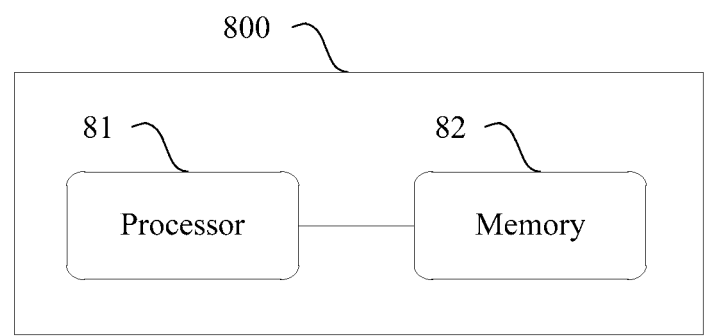
FIG. 25 is a schematic structural diagram of Embodiment 5 of a first device according to the present invention.

FIG. 25 is a schematic structural diagram of Embodiment 5 of a first device according to the present invention. As shown in FIG. 25, a first device 800 provided in this embodiment includes a processor 81 and a memory 82. The memory 82 stores an execution instruction. When the first device runs, the processor 81 communicates with the memory 82. The processor 81 invokes the execution instruction in the memory 82, so as to execute the method embodiment shown in FIG. 15. An implementation principle and a technical effect of this embodiment are similar to those of the method embodiment, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network side device, comprising:
a processor, configured to generate a first sequence group, wherein the first sequence group is generated according to a sequence group corresponding to a first sub-area, wherein
the first sequence group comprises N mutually orthogonal sequences, and N≥1;
the first sub-area is one of X sub-areas comprised in a first area, the first area is one of Y areas, the Y areas are obtained after the network side device divides at least one cell, the X sub-areas are obtained after the network side device divides the first area, X≥2, and 2≤Y≤X; and
the sequence group corresponding to the first sub-area is configured by the network side device for the first sub-area after the network side device divides the first area; and
a transmitter, configured to send, to a first device and a second device, the first sequence group generated by the processor, so that the first device pages and/or synchronizes with the second device via the first sequence group, wherein the first device is user equipment located in the first sub-area and is a device that accesses the network side device, and the second device is a device configured to access the network side device by via the first device.

2. The device according to claim 1, wherein
the processor is further configured to: after the transmitter sends the first sequence group to the first device, determine that the first device moves to a second sub-area, and keep a sequence group of the first device being configured to the first sequence group unchanged; or determine that the first device moves to a second sub-area, and send a second sequence group to the first device, wherein the second sequence group is generated according to a sequence group corresponding to the second sub-area, the second sub-area is one of the X sub-areas other than the first sub-area in the first area, the second sequence group comprises N mutually orthogonal sequences, and a sequence comprised in the sequence group corresponding to the first sub-area and a sequence comprised in the sequence group corresponding to the second sub-area are mutually orthogonal.

3. The device according to claim 2, further comprising:
a receiver, configured to: before the processor determines that the first device moves to the second sub-area, receive a first notification message sent by the first device, wherein the first notification message indicates that the first device is located in the second sub-area, and the sequence group of the first device is the first sequence group.

4. The device according to claim 1, wherein
after the transmitter sends the first sequence group to the first device, the processor is further configured to:
determine that the first device moves to a third sub-area, and send a third sequence group to the first device, wherein the third sequence group is generated according to a sequence group corresponding to the third sub-area, the third sub-area is one of all sub-areas in a second area, the third sequence group comprising N mutually orthogonal sequences, and the second area being one of areas other than the first area in the Y areas.

5. The device according to claim 4, further comprising:
a receiver, configured to: before the processor determines that the first device moves to the third sub-area, receive a second notification message sent by the first device, wherein the second notification message indicates that the first device is located in the third sub-area, and a sequence group of the first device is the first sequence group.

6. The device according to claim 4, wherein if the first sub-area in the first area is adjacent to the third sub-area in the second area, a sequence comprised in the sequence group corresponding to the first sub-area and a sequence comprised in the sequence group corresponding to the third sub-area are mutually orthogonal; or
if the first sub-area in the first area is not adjacent to the third sub-area in the second area, a sequence comprised in the sequence group corresponding to the first sub-area and a sequence comprised in the sequence group corresponding to the third sub-area are mutually orthogonal or to be reused.

7. The device according to claim 1, wherein the processor generates the first sequence group, after dividing the at least one cell to obtain the Y areas, and after dividing the first area to obtain the X sub-areas.

8. The device according to claim 1, wherein sequences comprised in sequence groups corresponding to all the sub-areas comprised in the first area are mutually orthogonal.

9. The device according to claim 1, wherein
the transmitter is further configured to send, to the first device and the second device, identifiers of the N mutually orthogonal sequences comprised in the first sequence group, so that the first device generates, according to the identifiers of the N mutually orthogonal sequences, a subframe carrying at least one first sequence, wherein the first sequence is one of the sequences comprised in the first sequence group.

10. The device according to claim 9, wherein the subframe is a normal cyclic prefix subframe, and the at least one first sequence occupies one or more of a first symbol, a fourth symbol, a fifth symbol, a sixth symbol, a seventh symbol, a ninth symbol, a tenth symbol, or an eleventh symbol of the normal cyclic prefix subframe, or the at least one first sequence occupies one or more of a first symbol, a fourth symbol, a fifth symbol, a sixth symbol, a seventh symbol, a ninth symbol, a tenth symbol, an eleventh symbol, or a fourteenth symbol of the normal cyclic prefix subframe.

11. The device according to claim 9, wherein the subframe is an extended cyclic prefix subframe, and the at least one first sequence occupies one or more of a third symbol, a fourth symbol, a fifth symbol, a sixth symbol, a seventh symbol, an eighth symbol, or a ninth symbol of the extended cyclic prefix subframe, or the at least one first sequence occupies one or more of a third symbol, a fourth symbol, a fifth symbol, a sixth symbol, a seventh symbol, an eighth symbol, a ninth symbol, or a twelfth symbol of the extended cyclic prefix subframe.

12. User equipment, wherein the user equipment is a first device, and the first device comprises:
a receiver, configured to receive a first sequence group sent by a network side device, wherein the first sequence group is generated according to a sequence group corresponding to a first sub-area, wherein the first sequence group comprises N mutually orthogonal sequences, and N≥1;

the first sub-area is one of X sub-areas comprised in a first area, the first area is one of Y areas, the Y areas are obtained after the network side device divides at least one cell, the X sub-areas are obtained after the network side device divides the first area, X≥2, and 2≤Y≤X; and the sequence group corresponding to the first sub-area is configured by the network side device for the first sub-area after the network device divides the first area; and a processor, configured to page or synchronize with a second device via the first sequence group received by the receiver, wherein the first device is located in the first sub-area and is a device that accesses the network side device, and the second device is a device configured to access the network side device via the first device.

13. The device according to claim 12, wherein the receiver is further configured to: after the processor pages or synchronizes with the second device by using the first sequence group, receive a second sequence group sent by the network side device, wherein the second sequence group is generated according to a sequence group corresponding to a second sub-area, the second sub-area is one of the X sub-areas other than the first sub-area in the first area, the second sequence group comprises N mutually orthogonal sequences, and a sequence comprised in the sequence group corresponding to the first sub-area and a sequence comprised in the sequence group corresponding to the second sub-area are mutually orthogonal.

14. The device according to claim 13, further comprising:

a transmitter, configured to: before the receiver receives the second sequence group sent by the network side device, send a first notification message to the network side device, wherein the first notification message indicates that the first device is located in the second sub-area, and a sequence group of the first device is the first sequence group.

15. The device according to claim 12, wherein the receiver is further configured to: after the processor pages or synchronizes with the second device by using the first sequence group, receive a third sequence group sent by the network side device, wherein the third sequence group is generated according to a sequence group corresponding to a third sub-area, the third sub-area is one of all sub-areas in a second area, the third sequence group comprises N mutually orthogonal sequences, and the second area is one of areas other than the first area in the Y areas.

16. The device according to claim 15, further comprising:

a transmitter, configured to: before the receiver receives the third sequence group sent by the network side device, send a second notification message to the network side device, wherein the second notification message indicates that the first device is located in the third sub-area, and a sequence group of the first device is the first sequence group.

17. The device according to claim 15, wherein if the first sub-area in the first area is adjacent to the third sub-area in the second area, a sequence comprised in the sequence group corresponding to the first sub-area and a sequence comprised in the sequence group corresponding to the third sub-area are mutually orthogonal; or if the first sub-area in the first area is not adjacent to the third sub-area in the second area, a sequence comprised in the sequence group corresponding to the first sub-area and a sequence comprised in the sequence group corresponding to the third sub-area are mutually orthogonal or to be reused.

18. The device according to claim 12, wherein sequences comprised in sequence groups corresponding to all the sub-areas comprised in the first area are mutually orthogonal.

19. The device according to claim 12, wherein the receiver is specifically configured to receive identifiers that are sent by the network side device and that are of the N mutually orthogonal sequences; and the processor is specifically configured to: generate, according to the identifiers of the N mutually orthogonal sequences, a subframe carrying at least one first sequence, wherein the first sequence is one of the sequences comprised in the first sequence group; and send, to the second device, the subframe carrying the at least one first sequence, so as to page or synchronize with the second device by using the at least one first sequence.

* * * * *

UNITED STATES PATENT AND TRADEMARK OFFICE
CERTIFICATE OF CORRECTION

PATENT NO. : 10,812,303 B2
APPLICATION NO. : 15/763116
DATED : October 20, 2020
INVENTOR(S) : Da Wang et al.

Page 1 of 1

It is certified that error appears in the above-identified patent and that said Letters Patent is hereby corrected as shown below:

In the Claims

Column 35, Line 32, please delete "by" between "device" and "via".

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*